(12) United States Patent
Burns et al.

(10) Patent No.: US 10,402,181 B2
(45) Date of Patent: Sep. 3, 2019

(54) GENERATING AND OPTIMIZING DEPLOYMENT CONFIGURATIONS FOR ENROLLED DEVICES

(71) Applicant: AIRWATCH LLC, Atlanta, GA (US)

(72) Inventors: Christopher Burns, Atlanta, GA (US); Joshua Grey Pelkey, Atlanta, GA (US); Mandy Cornwell, Atlanta, GA (US); Colleen Caporal, Atlanta, GA (US); Drew Malcolm, Atlanta, GA (US); Subhashish Pattajoshi, Bangalore (IN); Devdutt Rajaram, Bangalore (IN); Pavan Gonagur, Bangalore (IN); Navendu Roy, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 32 days.

(21) Appl. No.: 15/334,315

(22) Filed: Oct. 26, 2016

(65) Prior Publication Data

US 2018/0018154 A1 Jan. 18, 2018

(30) Foreign Application Priority Data

Jul. 18, 2016 (IN) .............................. 201641024575

(51) Int. Cl.
*G06F 8/61* (2018.01)
*G06F 3/0484* (2013.01)
(Continued)

(52) U.S. Cl.
CPC .............. *G06F 8/61* (2013.01); *G06F 3/0484* (2013.01); *G06F 8/71* (2013.01); *H04L 67/34* (2013.01); *G06F 3/0482* (2013.01)

(58) Field of Classification Search
CPC ....................................................... G06F 8/61
(Continued)

(56) References Cited

U.S. PATENT DOCUMENTS

| 6,986,135 | B2 * | 1/2006 | Leathers | ................... G06F 8/60 |
| | | | | 709/223 |
| 7,779,091 | B2 * | 8/2010 | Wilkinson | .............. G06F 9/505 |
| | | | | 709/220 |

(Continued)

OTHER PUBLICATIONS

"A Contract-Based Approach of Resource-Constrained Software Deployment"—Nicolas Le Sommer and Frederic Guidec; VALORIA Laboratory, University of South Brittany, France. CD 2002, LNCS 2370, pp. 15-30, 2002.*

*Primary Examiner* — Francisco J Aponte
(74) *Attorney, Agent, or Firm* — Thomas | Horstemeyer, LLP

(57) ABSTRACT

Disclosed are various examples generating and optimizing deployment configurations for devices enrolled with a management service. A computing environment can be employed to receive information pertaining to a desired configuration of enrolled devices during an ingestion process where at least one user interface is generated, where the information received includes a specification of a client application, a resource, and a policy for implementation on a plurality of client devices enrolled with a management service. The enrolled devices can have different operating system installed thereon. The computing environment can generate a deployment configuration using the information received during the ingestion process, where the deployment configuration is universal across the client devices independent of the different operating systems. The deployment configuration can be published for at least one user group that causes the client devices to automatically install the client application and the resource, and implement the policy.

17 Claims, 18 Drawing Sheets

(51) Int. Cl.
*H04L 29/08* (2006.01)
*G06F 8/71* (2018.01)
*G06F 3/0482* (2013.01)

(58) Field of Classification Search
USPC .......................................................... 717/177
See application file for complete search history.

(56) References Cited

U.S. PATENT DOCUMENTS

| | | | | |
|---|---|---|---|---|
| 8,132,166 | B2* | 3/2012 | DeHaan | G06F 8/61 |
| | | | | 717/171 |
| 8,707,385 | B2* | 4/2014 | Jain | G06F 21/577 |
| | | | | 705/38 |
| 9,519,469 | B2* | 12/2016 | Li | G06F 11/34 |
| 9,569,205 | B1* | 2/2017 | McCorkendale | G06F 8/71 |
| 9,612,815 | B1* | 4/2017 | Jagtap | G06F 8/61 |
| 9,805,189 | B2* | 10/2017 | Karaa | G06F 8/61 |
| 2005/0289538 | A1* | 12/2005 | Black-Ziegelbein | G06F 8/61 |
| | | | | 717/177 |
| 2006/0184937 | A1* | 8/2006 | Abels | G06F 8/65 |
| | | | | 718/1 |
| 2007/0113066 | A1* | 5/2007 | Samba | G06F 8/61 |
| | | | | 713/1 |
| 2010/0100611 | A1* | 4/2010 | Hatasaki | G06F 13/00 |
| | | | | 709/221 |
| 2010/0169860 | A1* | 7/2010 | Biazetti | H04L 41/0806 |
| | | | | 717/107 |
| 2010/0211943 | A1* | 8/2010 | Chu | G06F 8/61 |
| | | | | 717/174 |
| 2011/0214121 | A1* | 9/2011 | Gentile | H04L 43/065 |
| | | | | 717/177 |
| 2012/0096365 | A1* | 4/2012 | Wilkinson | G06F 9/468 |
| | | | | 715/740 |
| 2013/0132942 | A1* | 5/2013 | Wang | G06F 8/61 |
| | | | | 717/176 |
| 2014/0007048 | A1* | 1/2014 | Qureshi | G06F 21/10 |
| | | | | 717/110 |
| 2014/0053149 | A1* | 2/2014 | Wu | G06F 8/61 |
| | | | | 717/176 |
| 2014/0109083 | A1* | 4/2014 | Scheidel | G06F 8/61 |
| | | | | 717/177 |
| 2014/0259007 | A1* | 9/2014 | Karaa | G06F 8/61 |
| | | | | 717/174 |
| 2016/0373301 | A1* | 12/2016 | Sakata | G06F 8/60 |
| 2018/0018675 | A1* | 1/2018 | Ekambaram | G06Q 30/018 |

* cited by examiner

Figure 2A:
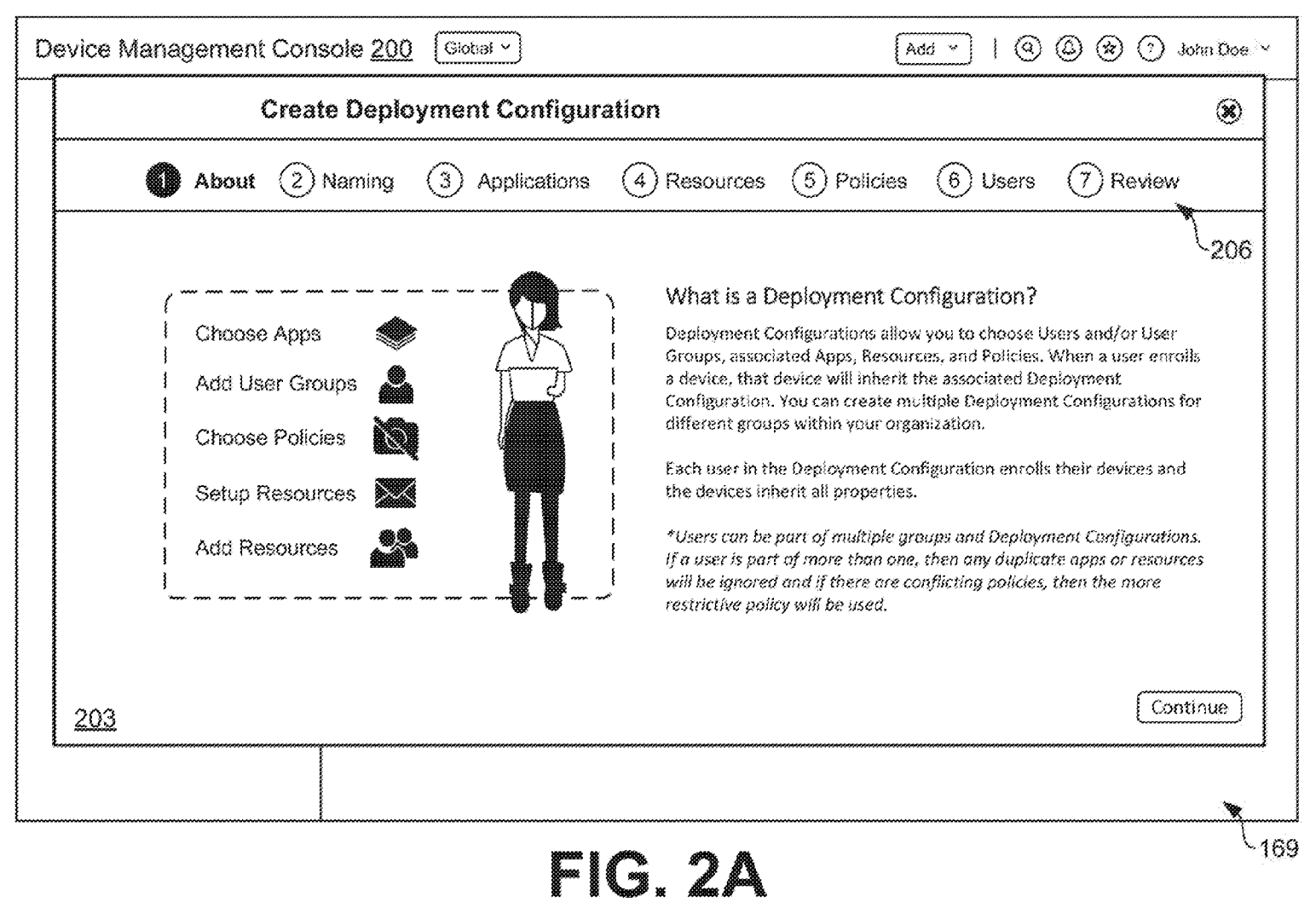

Device Management Console 200 [Global ▾]     Add ▾  |  🔍 ⊕ ⚙ ? | John Doe ▾

Create Deployment Configuration

① About  ② Naming  ③ Applications  ④ Resources  ⑤ Policies  ⑥ Users  ⑦ Review ← 206

What is a Deployment Configuration?

Deployment Configurations allow you to choose Users and/or User Groups, associated Apps, Resources, and Policies. When a user enrolls a device, that device will inherit the associated Deployment Configuration. You can create multiple Deployment Configurations for different groups within your organization.

Each user in the Deployment Configuration enrolls their devices and the devices inherit all properties.

*Users can be part of multiple groups and Deployment Configurations. If a user is part of more than one, then any duplicate apps or resources will be ignored and if there are conflicting policies, then the more restrictive policy will be used.

- Choose Apps
- Add User Groups
- Choose Policies
- Setup Resources
- Add Resources

Device Management Console 200 [Global ⌄]     [Add ⌄]  | ⊙ ⊙ ⊕ ⊙ | John Doe ⌄

Create Deployment Configuration                                                  Save & Exit ⊗

(✓) About  (✓) Naming  (✓) Applications  (✓) Resources  ⑤ Policies  ⑥ Users  ⑦ Review

Select Policies        [Restore Defaults]

Adjust the policies below to control the actions your users can perform on their enrolled devices.

- 145a ▸ Require Passcode?       [ No | Yes ]
- 145b ▸ Minimum Passcode Length       [ 4 ⌄ ]
- 145c ▸ Auto Lock (minutes)       [ 1 ⌄ ]
- 145d ▸ Max Failed Attempts       [ 4 ⌄ ]
- 145e ▸ Password Complexity       [ Simple | Alphanumeric ]
- 145f ▸ Max Password Age       [ 60 ⌄ ]

```
<deploymentconfiguration>
    <usergroup>
        <name>K-8 Teachers</name>
        ...
    </usergroup>                         166a
    <operatingsystem>
        <name>Android</name>
        <application>
            <name>Workspace ONE</name>
            <location>http://...workspaceONE.apk</location>
        </application>                                          ⬉139a
        <policy>
            <name>Bluetooth</name>
            <enabled>True</enabled>
        </policy>                        ⬉142a
        <policy>
            <name>Camera</name>
            <enabled>False</enabled>
        </policy>                        ⬉142b
        ...
    </operatingsystem>                   166b
    <operatingsystem>
        <name>iOS</name>
        <application>
            <name>Workspace ONE</name>
            <location>http://...workspaceONE.ipa</location>
        </application>                                          ⬉139b
        <policy>
            <name>Bluetooth</name>
            <enabled>True</enabled>
        </policy>                        ⬉142c
        <policy>
            <name>Camera</name>
            <enabled>False</enabled>
        </policy>                        ⬉142d
        ...
    </operatingsystem>
    <resource>
        <name>Wi-Fi</name>
        <ssid>Whackamole</ssid>
        <password>whackamole1234</ssid>
    </resource>                          ⬉145a
    <resource>
        <name>E-mail</name>
        ...
    </resource>                          ⬉145b
    ...
</deployment_configuration>                                     ⬉130
```

FIG. 10

GENERATING AND OPTIMIZING DEPLOYMENT CONFIGURATIONS FOR ENROLLED DEVICES

RELATED APPLICATIONS

Benefit is claimed under 35 U.S.C. 119(a)-(d) to Foreign application Serial No. 201641024575 filed in India entitled "GENERATING AND OPTIMIZING DEPLOYMENT CONFIGURATIONS FOR ENROLLED DEVICES", on Jul. 18, 2016, by AIRWATCH LLC., which is herein incorporated in its entirety by reference for all purposes.

BACKGROUND

With the emergence of bring-your-own-device (BYOD) technology in the workplace, an enterprise can permit its employees to use their own devices to access enterprise data, such as email and corporate documents. However, prior to an employee using his or her own device in the workplace, the enterprise can require the employee to enroll with a management service capable of protecting enterprise data stored on a device from theft, data loss, and unauthorized access.

Particular operating systems offer device management capabilities that allow an administrator, such as one associated with an enterprise, to remotely manage the configuration of a device. For example, an administrator of an enterprise can remotely install applications, resources, or other data on an employee's device. However, depending on the sophistication of the administrator, remotely configuring a device, or a multitude of devices with varying capabilities, can be problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2B, 3A-3E, 4A-4C, 5A-5B, and 6-8 are drawings of user interfaces rendered in the networked environment during an ingestion process.

FIG. 10 is an example deployment configuration including extensible markup language (XML) markup.

DETAILED DESCRIPTION

Figure 1:
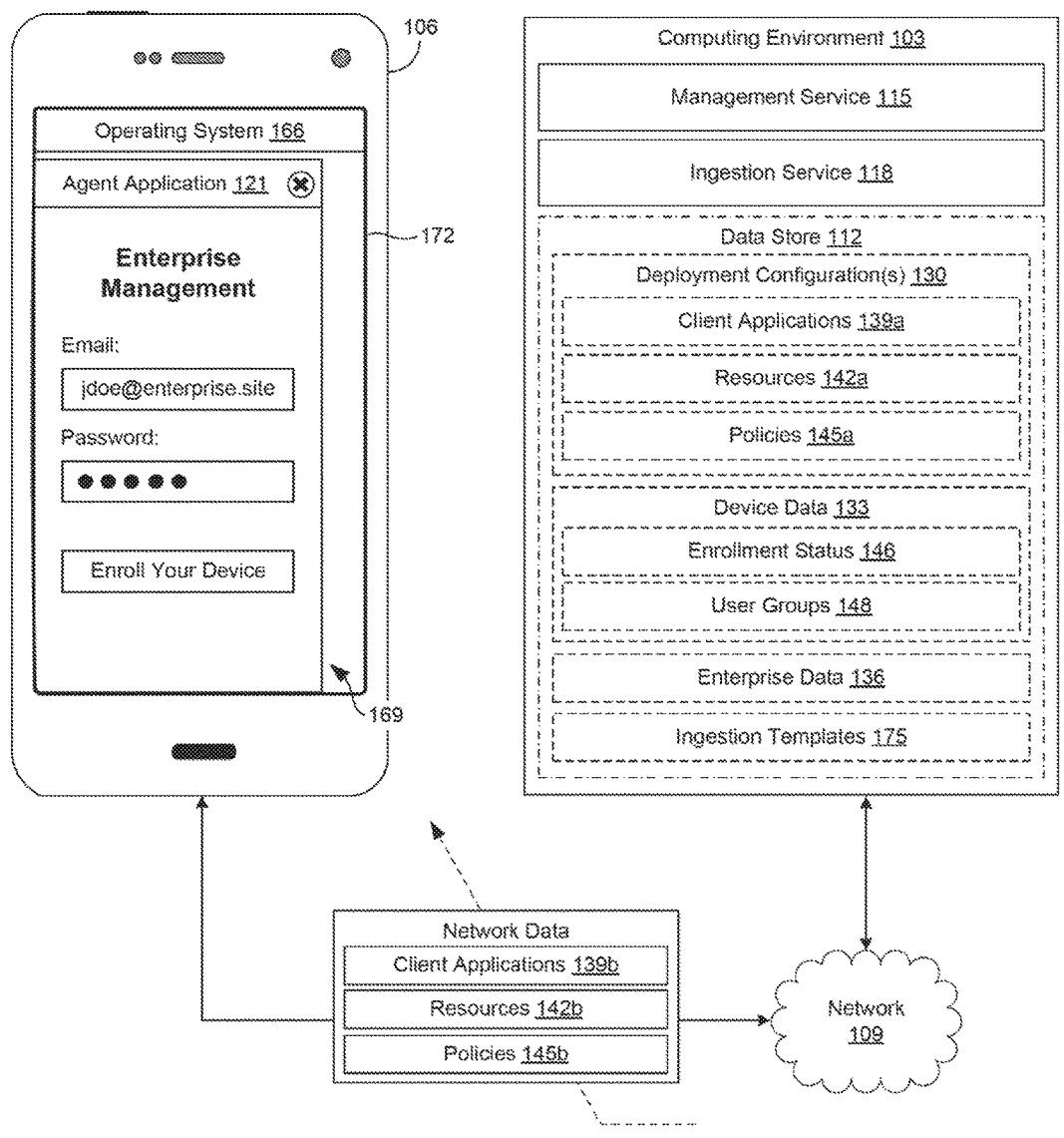
FIG. 1 is a drawing of a networked environment including a management service, an ingestion service, and a client device.

The present disclosure relates to generating and optimizing deployment configurations for enrolled devices. Different devices can have one or more of a multitude of operating systems installed thereon. For example, devices brought into a given workplace can have either the Microsoft Windows®, Apple iOS®, Android®, Ubuntu® Linux, or other operating system installed thereon. Each operating system provides varying degrees of features, capabilities, and restrictions. For example, one operating system can allow an administrator to remotely control Bluetooth® functionality on a device while another operating system may restrict or not provide access to the Bluetooth® functionality. Configuring devices having one of a multitude of operating systems with varying capabilities and restrictions can be problematic, even to administrators having in-depth knowledge of device configuration.

Further, current limitations on management services require an administrator to designate different client applications, resources, and policies for each operating system used in a BYOD environment. For example, in order to configure policies for devices having one of five different operating systems, an administrator is required to designate an operating system, choose a correct restrictions payload, set each restriction, and publish a configuration for the designated operating system. This process repeats for the other operating systems. As the restrictions and capabilities differ for each operating system, an administrator must be aware of a multitude of differences and nuances prior to setting restrictions.

The aforementioned limitations are addressed herein by generating one or more deployment configurations for enrolled devices using a single ingestion process that is intuitive to administrators of a management service. In one example, a computing environment can receive information pertaining to a deployment configuration provided during an ingestion process where at least one user interface is generated. The information received can include a specification of a client application, a resource, and a policy for implementation on a plurality of client devices enrolled with a management service. As can be appreciated, individual ones of the plurality of enrolled devices can have a different operating system installed thereon.

Next, the computing environment can generate a deployment configuration using the information received during the ingestion process. In some examples, the deployment configuration is universal across the plurality of client devices independent of the various operating systems installed on respective devices. The computing environment can publish the deployment configuration for at least one user group, thereby causing the client devices to automatically implement the client application, the resource, and the policy on the client devices currently enrolled with the management service, or at a time when a client device newly enrolls with the management service.

Until now, in order to search and add applications for their required platforms to the MDM console, an admin must choose what type of app to see (e.g., public, internal), click to begin the app adding process for such app type, choose a platform of a target device, choose a country associated with the device, search for and select the app based on the platform and country, and then configure the app. This repeats until all platforms desired are added. When four platforms i.e., operating systems) are selected by the administrator or are designated as default platforms for configuring (e.g., Apple iOS®, Android®, Apple OSX®, Windows®), this is a minimum of 28 total clicks. As described herein, a new framework for app configuration is provided. In one embodiment, in order to search and add applications for their required platforms to the MDM console, an admin initiates the app configuration module, selects the app type, selects the platforms for which the app should be configured, and searches and selects the apps. This is only done once. When four platforms are selected by the administrator or are designated as default platforms for configuring, this is a minimum of 11 clicks. This is improved by adding an apps simultaneously and once one platform has been searched, the search query is passed to the next platform.

A deployment configuration can include data generated during by an administrator that causes client applications, resources, policies and other data to be installed or implemented on enrolled devices. When a user enrolls his or her device, the device will inherit the associated deployment configuration. In other words, the client applications, resources, policies, and other data specified by the administrator will be automatically installed or implement on the device. The deployment configuration can include an extensible markup language (XML) document or data stored in a database, such as a structured query language (SQL) database.

The administrator can create deployment configurations for different groups within an enterprise. The different groups are referred to as user groups. Each user in a user group having a corresponding deployment configuration inherits all properties associated with the corresponding deployment configuration. In one example, a single deployment configuration can be generated for a single user group. In other examples, a single deployment configuration can be generated for various user groups.

If a user is part of more than one user group, any duplicate client applications, resources, or other data can be ignored and, if conflicting policies exist among the different user groups, then the more restrictive policy can be automatically employed.

With reference to FIG. 1, shown is an example of a networked environment 100. The networked environment 100 can include a computing environment 103 and a client device 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in of one or more server banks, computer banks, or other arrangements. The computing environments 103 can include a grid computing resource and/or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 109, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications and/or functional entities described below.

The components executed on the computing environment 103 can include, for example, a management service 115, an ingestion service 118, as well as other applications, services, processes, systems, engines, or functionality not discussed in detail herein. The management service 115 can be executed to oversee the operation of client devices 106 enrolled with the management service 115. In some embodiments, an enterprise, such as one or more companies or other organizations, can operate the management service 115 to oversee or manage the operation of the client devices 106 of its employees, contractors, customers, or other users having user accounts with the enterprise.

The management service 115 can cause various software components to be installed on a client device 106. Such software components can include, for example, client applications, resources, libraries, drivers, device configurations, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data is secured on the client device 106.

The management service 115 can interact with one or more client applications executed on the client device 106. In one example, the management service 115 interacts with an agent application 121 on the client device 106 to enroll the client device 106 with the management service 115. The agent application 121 can be registered as a device administrator of the client device 106, which can provide the agent application 121 with sufficient privileges to control the operation of the client device 106. In one example, the agent application 121 can be registered as the device administrator through the installation of a management profile at the operating system of the client device 106 that causes the operating system to designate the agent application 121 as the device administrator. The management service 115 can direct the agent application 121 to perform device management functions on the client device 106. For example, the management service 115 can direct the agent application 121 to control access to certain software or hardware functions available on the client device 106. As a result, the management service 115 can verify that configuration and operation of the client device 106 is in conformance with predefined criteria that ensures that enterprise data, or other data, is protected from data loss, unauthorized access, or other harmful event. The management service 115 can further provision enterprise data to the client device 106 through the agent application 121.

In one example, the management service 115 can cause the agent application 121 to control use of the client device 106 or provision enterprise data to the client device 106 through use of a command queue provided by the management service 115. The management service 115 can store commands in a command queue associated with a particular client device 106 and can configure an agent application 121 executed by such client device 106 to retrieve the contents of the command queue. In one example, the agent application 121 can be configured to retrieve the contents of the command queue on a configured interval (e.g., every four hours) or upon a certain event occurring (e.g., detection of an unauthorized application executed by the client device 106). In any case, the agent application 121 can retrieve the contents of the command, queue by checking in with the management service 115 and requesting the contents of the command queue. In one example, the contents of the command queue can include a command that the agent application 121 should cause to be executed on the client device 106. In another example, the contents of the command queue can include a resource 145 or client application 139 that the agent application 121 should cause to be installed on the client device 106, which the client device 106 may access through a URL specified by the command retrieved through the command queue.

In one example, upon the management service 115 receiving a request to publish a deployment configuration 130 to one or more client devices 106, the management service 115 can identify one or more data records associated with such deployment configuration 130 and can populate command queues associated with such client devices 106 with commands associated with such data records. For instance, a data record associated with a client application 139a can specify that a particular application should be installed, a particular configuration for the particular application should be applied, and a particular URL from which the particular application can be downloaded. Based on such data record specifications, a command can be generated and placed in a command queue that, when executed by the client device 106, causes the client device 106 to download the particular application from the particular URL, install the application, and change configuration data associated with the particular application to cause the particular application to function in accordance with the particular configuration. Accordingly, upon a request to publish a deployment configuration 130 to particular client devices 106, the management service 115 can identify one or more data records associated with the deployment configuration 130, and can appropriately populate command queues associated with such client devices 106, which can in turn cause such client devices 106 to operate in accordance with the specifications associated with the deployment configuration 160.

The data stored in the data store 112 can include, for example, deployment configurations 130, device data 133, enterprise data 136, as well as other data. Generally, deployment configurations 130 include data associated with a configuration of a client device 106 enrolled or managed by the management service 115. Deployment configurations 130 can include, for example, data generated by an administrator that deploys specified client applications 139a and 139b (collectively "client applications 139"), resources 142a and 142b (collectively "resources 142"), policies 145a and 145b (collectively "policies 145"), or other data to a client device 106.

In one example, the ingestion service 118 generates one or more user interfaces that obtain information about the configuration of client devices 106 enrolled (or to be enrolled) with the management service 115, referred to herein as an ingestion process. An administrator or other appropriate user can provide information during the ingestion process regarding how the administrator desires to configure the client devices 106. In one example, the administrator can specify a client application 139 to be installed on the client device 106. After completion of the ingestion process, a deployment configuration 130 is generated and published. When published, the management service 115 or the agent application 121 on a client device 106 can identify the deployment configuration 130 as being applicable to the client device 106 and, as a result, will download and install the client application 139 specified by the administrator.

Resources 142 can also be specified in the ingestion process by an administrator. Resources 142 can include files or other applicable data relating to the configuration of a client device 106. In one example, resources 142 can include authentication data associated with a wireless network or an email service. By providing a resource 142 to the client device 106, for example, having information pertaining to a wireless network, the agent application 121 can preconfigure the client device 106 to access the wireless network using the authentication data specified in the resource 142.

Policies 145 can include constraints specified by an administrator for a client device 106 to be in "compliance" with the management service 115. Policies 145 can include compliance rules or other criteria. In one example, the agent application 121 can configure hardware or software functionality of a client device 106 such that the client device 106 is in conformance with the policies 145. Additionally, the agent application 121 can identify when the client device 106 is not in conformance with the policies 145 and can take appropriate remedial actions, such as denying access to enterprise data 136 or other features of the agent application 121.

In other words, the policies 145 can include predefined constraints that must be met in order for the management service 115, or other application, to permit access to the enterprise data 136. In some examples, the management service 115 communicates with the agent application 121 or other client application 139 executable on the client device 106 to determine whether vulnerabilities exist on the client device 106 that do not satisfy policies 145. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications, or other vulnerability as can be appreciated.

Device data 133 can include, for example, data pertaining to an enrollment status 146 for individual ones of the client devices 106. In one example, a client device 106 designated as "enrolled" can be permitted to access the enterprise data 136 while a client device 106 designated as "not enrolled" or having no designation can be denied access to the enterprise data 136. Device data 133 can also include data pertaining to user groups 148. An administrator can specify one or more of the client devices 106 as belonging to a particular user group 148. The management service 115 can use a deployment configuration 130 applicable to the particular user group 148 to configure the client devices 106 associated with the user group 148.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized to communication capability.

The client device 106 can include an operating system 156 configured to various client applications 139, such as the anent application 121 or other application. Some client applications 139 can access network content served up by the computing environment 103 or other servers, thereby rendering a user interface 169 on a display 172, such a liquid crystal display (LCD), to screen display, or other type of display device. To this end, some client applications 139 can include a browser or a dedicated application, and a user interface can include network page, an application screen, or other interface. Further other client applications 139 can include device management applications, enterprise applications, social networking applications, word processors, spreadsheet applications, media viewing application, or other applications.

Next a general description of the operation of the carious components of the networked environment 100 is provided. The management service 115 can be employed, for example, to manage and oversee the operation of client devices 106. For example, in a BYOD environment, an administrator can oversee the operation of client devices 406 using the management service 115 such that unauthorized access to enterprise data 136 is not obtained. Additionally, the management service 115 can provision (or "serve up") enterprise data 136 to client devices 106 enrolled with the management service 115 and in conformance with policies 145 defined by an administrator.

In BYOD environments, it can be expected that different types of client devices 106 can have different operating systems 166 installed thereon. For example, an operating system 166 executing on a client device 106 can include the Microsoft Windows®, Apple iOS®, Apple OSX®, Android®, Ubuntu® Linux, or other operating system 166. Each operating system 166 and client device 106 can provide varying degrees of features, capabilities, and restrictions. For example, one operating system 166 can allow an administrator to control camera functionality on a device while a different operating system 166 can restrict or not provide access to camera functionality. Configuring devices having one of a multitude of operating systems with varying capabilities and restrictions can be problematic, even to administrators having in-depth knowledge of device configuration.

Accordingly, the computing environment 103 can include an ingestion service 118 configured to perform an ingestion process, whereby a series of one or more user interfaces 169 are provided to an administrator. During the ingestion process, information is obtained through the one or more user interfaces 169. Based on the information provided by the administrator during the ingestion process, the computing environment 103 can generate a deployment configuration 130. When the deployment configuration 130 is published, any applicable client devices 106 will be configured in accordance with the deployment configuration 130.

As the restrictions and capabilities differ for each operating system 166 or type of client device 106, an administrator does not need to be aware of a multitude of differences and nuances between operating systems 166 and types of client devices 106. The ingestion service 118 can utilize ingestion templates 175 from the data store 112 to generate one or more user interfaces 169 to present to an administrator during the ingestion process. During the ingestion process, the administrator can provide information pertaining to the configuration of one or more of the client devices 106 enrolled with the management services 115.

In one example, the ingestion process can be performed by an administrator through a device management console application after having provided proper access credentials. The device management console application can include an application that configures various features of the management service 115, such that the administrator can configure the client devices 106. The ingestion process, through the one or more user interfaces 169, can collect information pertaining to client applications 139 or resources 142 to be deployed on the client devices 106 enrolled with the management service 115. Additionally, the ingestion process can collect information pertaining to policies 145 to be implemented on the client devices 106 by the agent application 121, the operating system 166, or other suitable software component.

First, the ingestion process, through one or more user interfaces 169, can collect information pertaining to client applications 139 requiring installation on the client devices 106. For example, an administrator can require an anti-virus application to be installed on each of the client devices 106 enrolled in the management service 115. The ingestion process can perform search queries to identify different versions of a client application 139 available for different types of operating systems 166 or client devices 106, as will be discussed. Additionally, as a particular provider of an anti-virus application may not offer a version for each type of operating system 166 the ingestion process can suggest a suitable alternative.

Next, the ingestion process can obtain information pertaining to one or more resources 142. Resources 142 can include files to be stored on the client device 106 for access by its user, or, in some examples, resources 142 can include data used to configure the client device 106. In one example, resources 142 can include settings for a wireless network such that the client device 106 can be configured to automatically connect to the wireless network without a user of the client device 106 being required to manually input authentication information, such as a service set identification (SSID) and password. In another example, resources 142 can include settings for an email service. Using these settings, the agent application 121 can configure the client device 106 to automatically connect to the email without a user of the client device 106 being required to manually input authentication information, such as an email address, password, server settings, or other technical information.

Next, the ingestion process can collect information pertaining to policies 145 to be implemented on the client devices 106. Policies 145 can include restrictions or controls to be implemented on a client device 106, for example, through the agent application 121. As different types of client devices 106 and operating systems 166 have different capabilities, the ingestion process can present information pertaining to each capability, such that the administrator can easily discern which policy 145 is implement on a particular type of client device 106 or operating system 166, as will be discussed.

After information pertaining to the configuration of the client devices 106 is obtained during the ingestion process, a deployment configuration 130 can be generated, where the deployment configuration 130 is universal across the plurality of client devices 106 independent of a different type of operating system 166. For instance, a single deployment configuration 130 can be generated that is capable of configuring client devices 106 having Microsoft Windows®, Apple iOS®, Android®, Ubuntu® Linux, or other operating system installed thereon. More specifically, one or more platform-specific versions of the single deployment configuration 130 can be generated and saved in the data store. 112, where a platform-specific version is created for each applicable platform. As such, when a deployment configuration 130 is defined ingestion process, the management service 115 can generate a platform-specific version of the deployment configuration 130 for it applicable platform and can store the platform-specific versions in the data store 112. In one embodiment, a default set of platforms to be configured can be designated (e.g., by an administrator of the management service 115), thereby specifying that the default set of platforms comprises the applicable platforms. In another embodiment, an administrator can select one or more platforms to which the configuration should apply (i.e., the applicable platforms).

The deployment configuration 130 can be saved in the data store 12 for further modification and, in some examples, it can be published by the administrator. Publication can include, for example, the agent application 121 or the management service 115 using the deployment configuration 130 to configure applicable client devices 106 in accordance with the deployment configuration 130. In some examples, the deployment configuration 130 can be associated with a corresponding one of the user groups 148. To this end, only the client devices 106 associated with the user groups 148 will be configured in accordance with the deployment configuration 130.

In one example, upon a request to publish a deployment configuration 130 to one or more client devices 106 (e.g., client devices 106 belonging to a particular device group associated with the deployment configuration 130), the management service 115 can identify an appropriate platform-specific version of the deployment configuration 130 for each of the client devices 106 based on their respective platforms (i.e. operating systems). That is, the management service 115 can query the data store 112 to identify a platform-specific version that each of the client devices 106 is capable of executing, implementing, or interpreting (i.e., based on their respective platform). In another example, upon such a request, the management service 115 can identify a non-platform-specific version of the deployment configuration 130 (e.g., a generalized version) and translate such version into a platform-specific version for each of the client devices 106 based on their respective platforms. In yet another example, a platform-specific version of the deployment configuration 130 that is not appropriate for a given client device 106 based on its platform can be translated into a platform-specific version that is appropriate for such client device 106 based on its platform.

Thereafter, in one example, the management service 115 can cause one or more client devices 106 to conform their operations to the specifications of the deployment configuration 130. In one example, the management service 115 can transmit an appropriate deployment configuration 130 (e.g., a platform-specific version or a generalized version) to a client device 106 and instruct the client device 106 to implement the deployment configuration 130. In another example, the management service 115 can store the deployment configuration 130 in a command queue associated with a client device 106 and can instruct the client device 106 to retrieve the deployment configuration 130 from the command, which in turn can cause the client device 106 to conform its operations to the specifications of the deployment configuration 130. In any case, in one example, as part of the dissemination of the deployment configuration 130 to client devices 106, the management service can generate an XML markup that represents one or more data records that comprise the specifications of the deployment configuration 130 and can cause such XML markup to be disseminated to the client devices 106 (i.e., instead of the deployment configuration 130 itself or any data records representing its specifications).

With reference to FIG. 2A, shown is example of a user interface 169 generated by the ingestion service 118, or other suitable service, to create an ingestion process where information is obtained from an administrator regarding the configuration or management of client devices 106. The user interface 169 of FIG. 2A can be generated to provide the administrator with an overview of types of information obtained during the ingestion process as well as the resulting effect of generating a deployment configuration 130. In one example, the ingestion process is performed in through a device management console 200. Through a suitable component of the device management console 200, a dialog box 203 can be generated that takes the administrator through a series of user interfaces 169 to obtain necessary information.

In one example, the dialog box 203 can include a navigational component 206 that provides an overview of the ingestion process. For example, the navigational component 206 can provide a current stage of the ingestion process as the user provides information. In some examples, the user can select or otherwise manipulate a stage specified in the navigational component 206 to backtrack or move forwards in the ingestion process.

Figure 2B:

Referring next to FIG. 2B, shown is another example of a user interface 169 generated during the ingestion process by the ingestion service 118. In the user interface 169 of FIG. 2B, the user can specify a name or label for the deployment configuration 130 that can be used to access the deployment configuration 130 at a future time or distinguish a deployment configuration 130 from others. In some examples, the name or label can correspond to a user group 148. In the example of FIG. 2B, the deployment configuration 130 is titled "K-8 Teachers," which can allow an administrator to identify that all client devices 106 owned by teachers who teach kindergarten to the eighth grade will be subject to the soon-to-be generated deployment configuration 130, as can be appreciated.

Figure 3A:
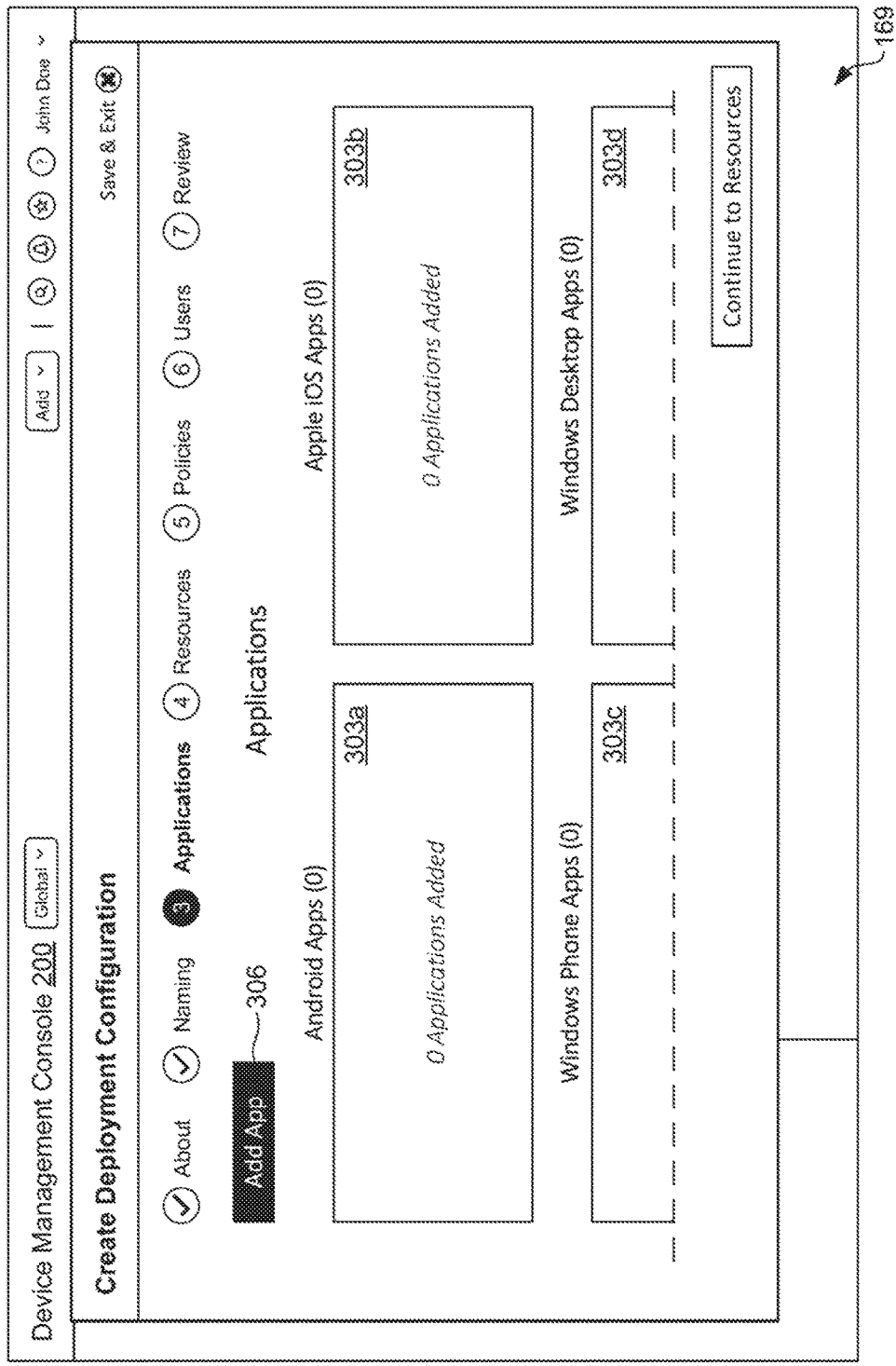

Turning now to FIG. 3A, shown is another example of a user interface 169 generated during the ingestion process by the ingestion service 118. The user interface 169 of FIG. 3A can include an overview of client applications 139 to be deployed on client devices 106 having a particular type of operating system 166 installed thereon. For example, the user interface 169 can include regions 303a . . . 303d (collectively "regions 303") that show particular client applications 139 that will be deployed on a particular type of operating system 166. For instance, any client applications 139 appearing in the first region 303a will be deployed to client devices 106 having the Android® operating system 166, and so forth. By selecting or otherwise manipulating an add application component 306, the administrator can specify which client applications 139 will be deployed on different types of operating systems 166 or client devices 106.

Figure 3B:
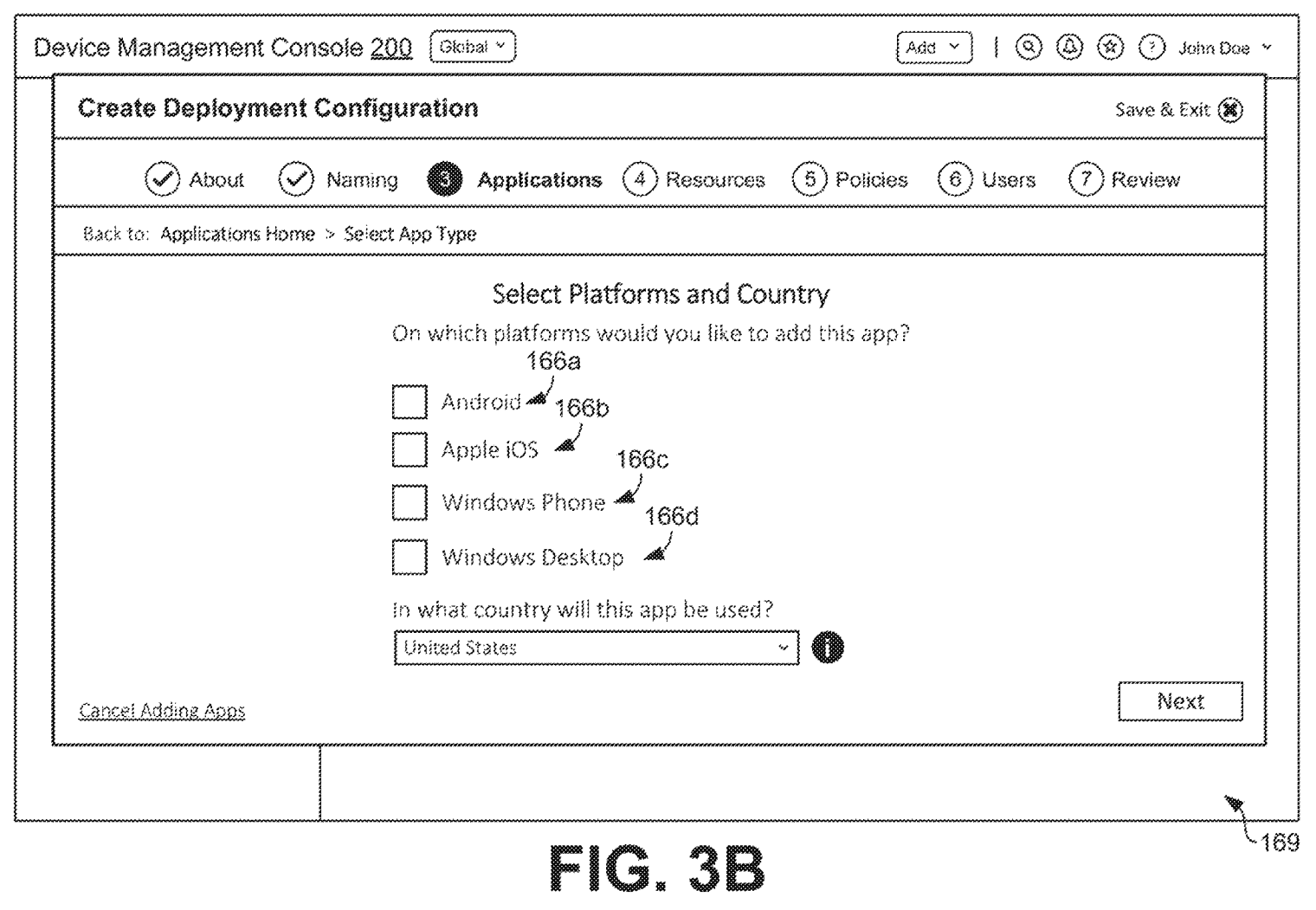

An example of a user interface 169 generated during the ingestion process to specify the client application 139 deployed on different types of operating systems 166 is shown in FIG. 3B. The user interface 169 can include a listing of various types of operating systems 166a, . . . 166d executable, by client devices 106 enrolled with the management service 115. By selecting or otherwise as manipulating a corresponding checkbox, the administrator may specify a single application to be deployed on different platforms.

Figure 3C:
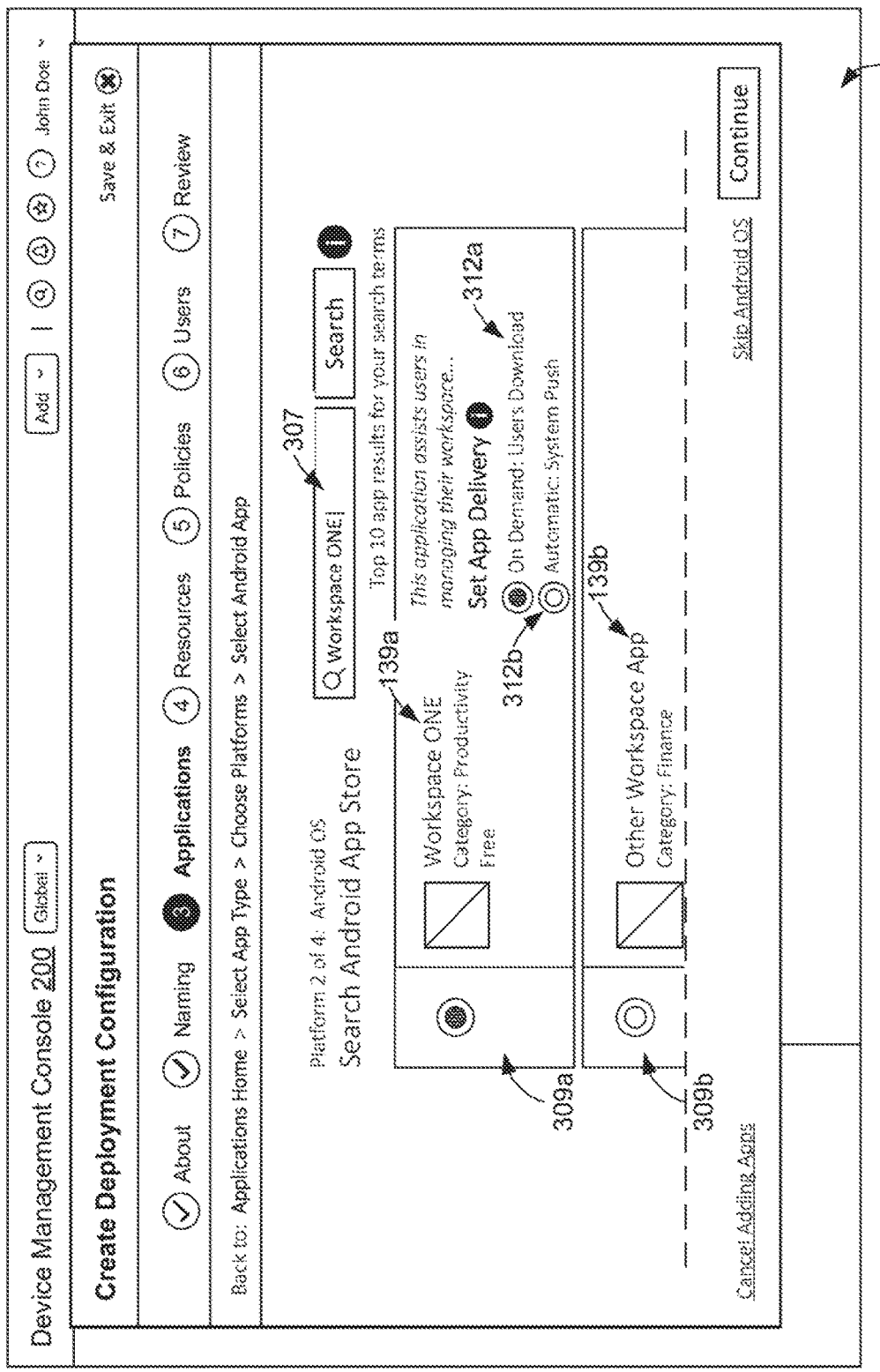

Moving on to FIG. 3C, shown is another example of a user interface 169 generated during the ingestion process by the ingestion service 118. After one or more platforms, or operating systems 166, are specified, the ingestion service 118 can facilitate a search process to locate a particular client application 139 that can be deployed on the client devices 106. In one example, a user interface 169 is generated for each of the operating systems 166 specified with respect to FIG. 3B. For instance, a user interface 169 can be generated to search for and select a client application 139 for the Android® operating system 166, while a subsequent user interface 169 can be generated to search for and select a client application 139 for the iOS® operating system 166.

The search process can include, for example, having the administrator specify a name, category, description, or other information pertaining to a client application 139 in a search field 307 and returning search results based on the specified query. In one example, the search can query the data store 112 to locate client applications 139 in accordance with the specified search query. The client applications 139 can include approved client applications 139 or client applications 139 generated using an application programming interface (API) associated with the management service 115. In further examples, the search process can include querying third-party application stores over the network 109.

After a query is performed, search results 309a ... 309b (collectively "search results 309") can be shown its the user interface 169. The search results 309 can include a listing of the client applications 139a ... 139b identified by the ingestion service 118 based on the search query provided by the administrator. The administrator can select an application delivery method 312a or 312b, for example, to specify whether the user of the client device 106 is permitted to download the client application 139 or automatically push the client application 139 to the client device 106.

In some situations, a client application 139 may have a version compatible with one operating system 166 while not having a version compatible with another operating system 166. The ingestion service 118 can expand the scope of the search query to identify other client applications 139 that can include a suitable replacement for the operating system 166 not having a compatible version. The suitable replacement for the client application 139 can be programmatically identified based on comparisons of an application category, free-text description, competitor applications, or other information.

Further, a query provided in the search field 307 by the administrator can be carried to any subsequent user interfaces 169 associated with identifying a client application 139 for a particular type of operating system 166. For instance, the "Workspace ONE" query specified in the user interface 169 for the Android® operating system 166 can be carried to a subsequent user interface 169 for the iOS® operating system 166, where a search is automatically performed according to the query. In other examples, an identifier for the client application 139 or developer selected in the user interface 169 for the Android® operating system 166 can be used to locate a compatible version of the same client application 139 for a different operating system 166.

Figure 3D:
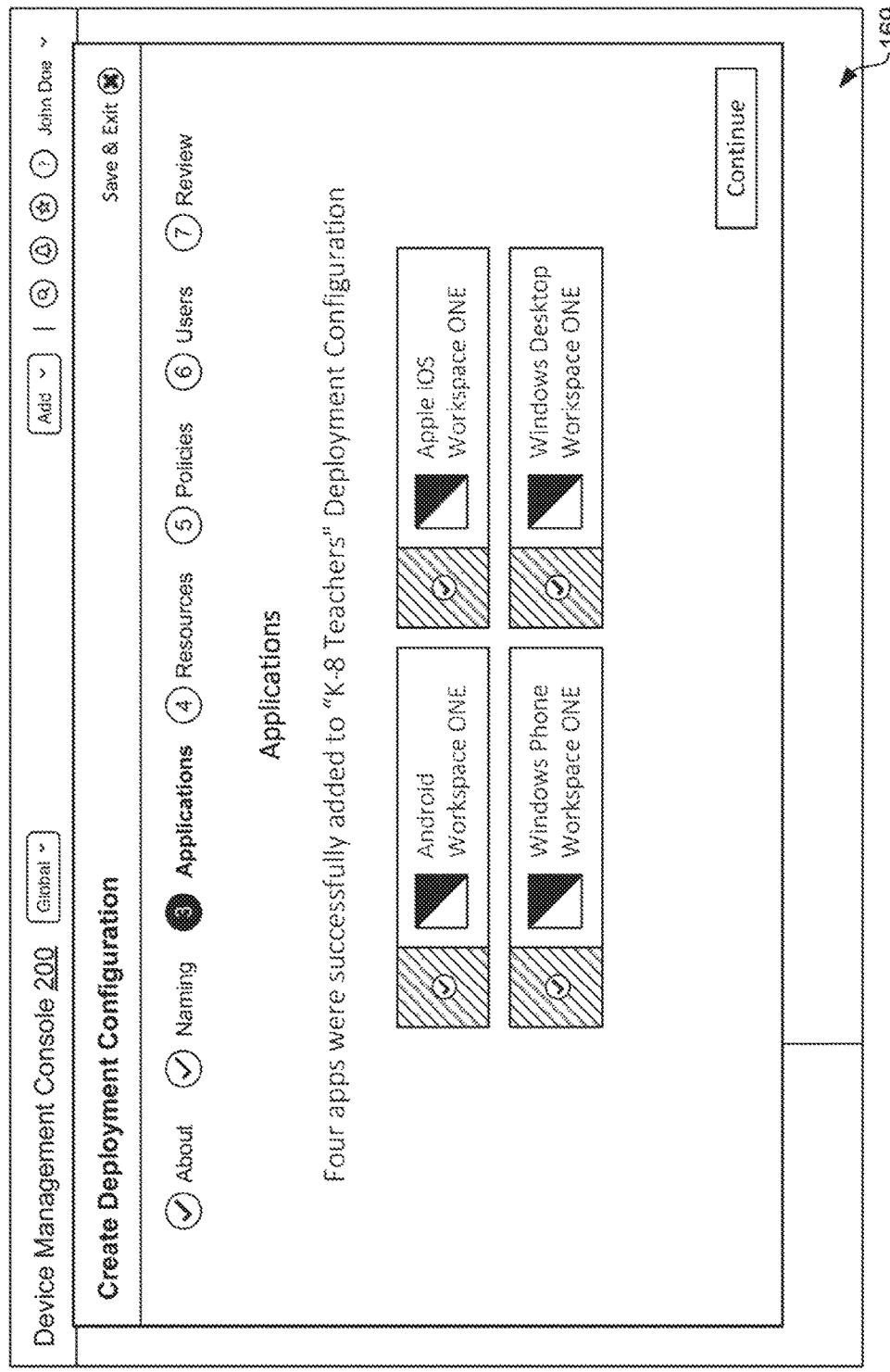

After the client applications 139 are selected for each of the operating systems 166 specified in FIG. 3B, the user interface 169 of FIG. 3D can be shown to provide the administrator with a summary of the client applications 139 added to the deployment configuration 130 for the specified operating systems 166. As shown in FIG. 3D, the client application 139 named "Workspace ONE" was selected for deployment on four operating systems 166, as a compatible version is available for each of the operating systems 166 specified in FIG. 3B.

Figure 3E:
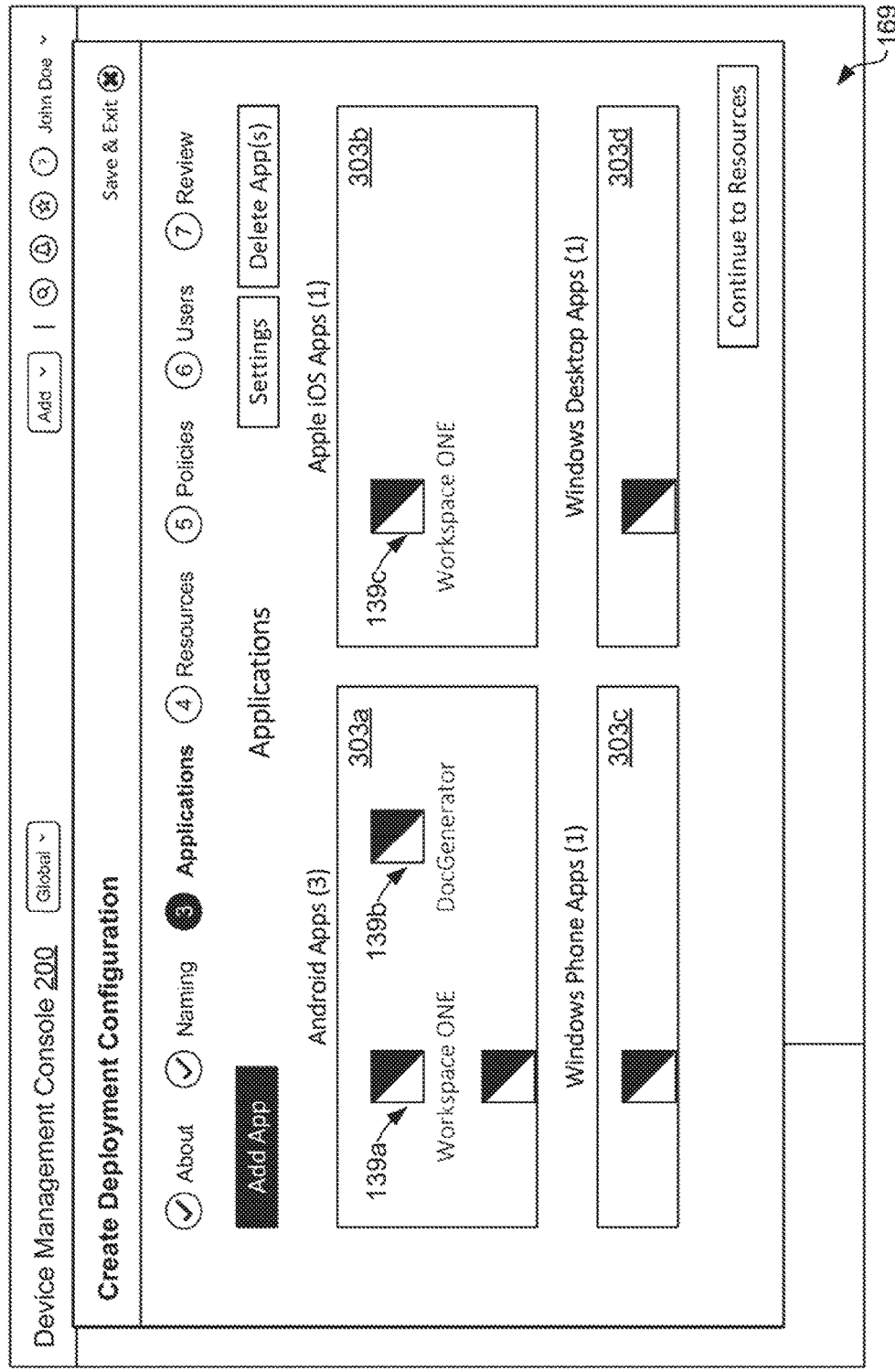

Turning now to FIG. 3E, shown is another example of a user interface 169 generated during the ingestion process by the ingestion service 118. The user interface 169 of FIG. 3E can include an updated overview of client applications 139 to be deployed on client devices 106 having a particular type of operating system 166. For example, the client applications 139a ... 139c specified in FIG. 3C or related user interfaces 169 can be included in the regions 303 of the user interface 169 of FIG. 3E. The administrator can quickly discern which client applications 139 will be deployed on client devices 106 having a particular operating system 166. For example, any client applications 139 appearing in the second region 303b will be deployed to client devices 106 having the iOS® operating system 166, and so forth.

Figure 4A:
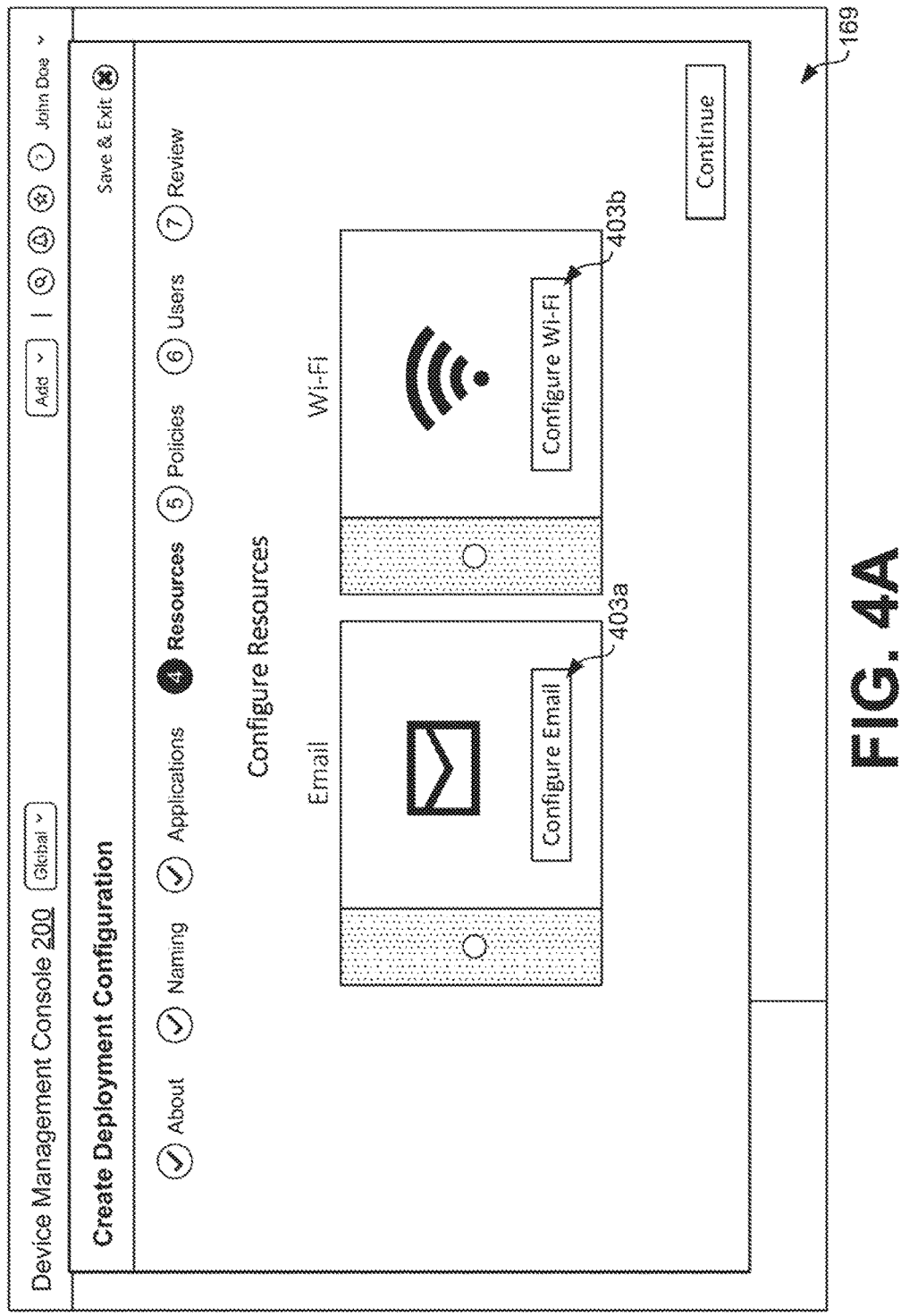

Referring next to FIG. 4A, the ingestion service 118 can generate a user interface 169 that facilitates configuring resources for deployment on the client devices 106. Resources 142 can include files or other data that can be used by the agent application 121 in the configuration of a client device 106. In one example, resources 142 can include settings for an email service. Using these settings, the agent application 121 can configure the client device 106 to automatically connect to the email without a user of the client device 106 being required to manually input authentication information, such as an email address, password, server settings, or other technical information. In another example, resources 142 can include settings for a wireless network such that the client device 106 can be configured to automatically connect to the wireless network without a user of the client device 106 being required to manually input authentication information, such as a SSID and password. By selecting an appropriate one of the configure resource components 403a or 403b, a subsequent user interface 169 can be generated to obtain information from the administrator regarding the resource 142.

Figure 4B:
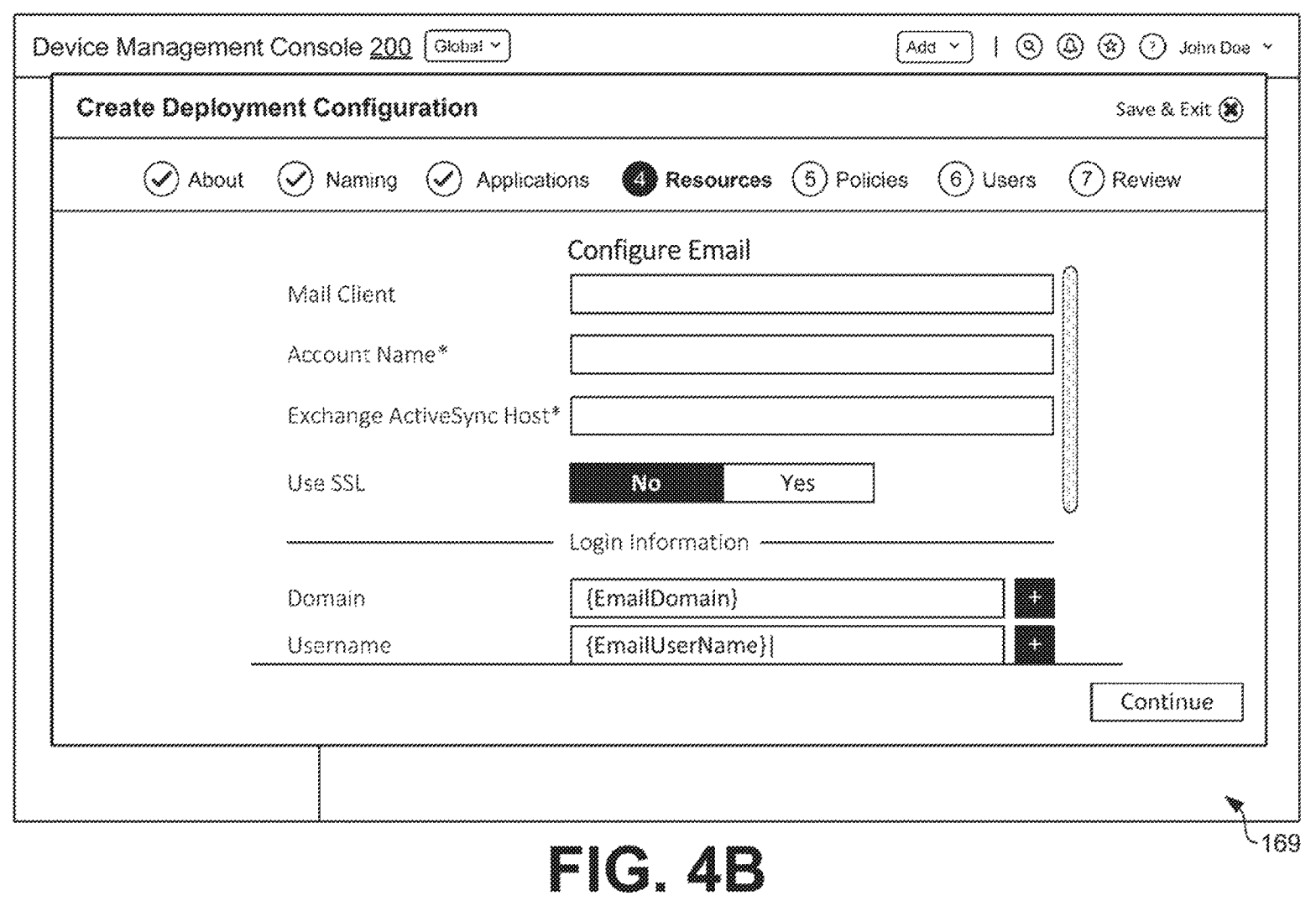

For example, if the user selects the first one of the configure resource components 403a, the user interface 169, as shown in FIG. 4B, can be presented to the administrator to obtain information pertaining to an email service to be preconfigured on a client device 106. For example, the administrator can provide information pertaining to a mail client, an account name, a Microsoft Exchange® Active-Sync® Host, a domain, a username, or other information. As some information, such as the domain and the username, can vary from each of the client devices 106, the ingestion service 118 can allow the administrator to provide wildcards that will be replaced by the agent application 121 when a particular client device 106 is configured. For instance, by providing a wildcard of "{EmailUserName}" in the username field, each client device 106 will be configured using a username corresponding to the respective client device 106.

Figure 4C:
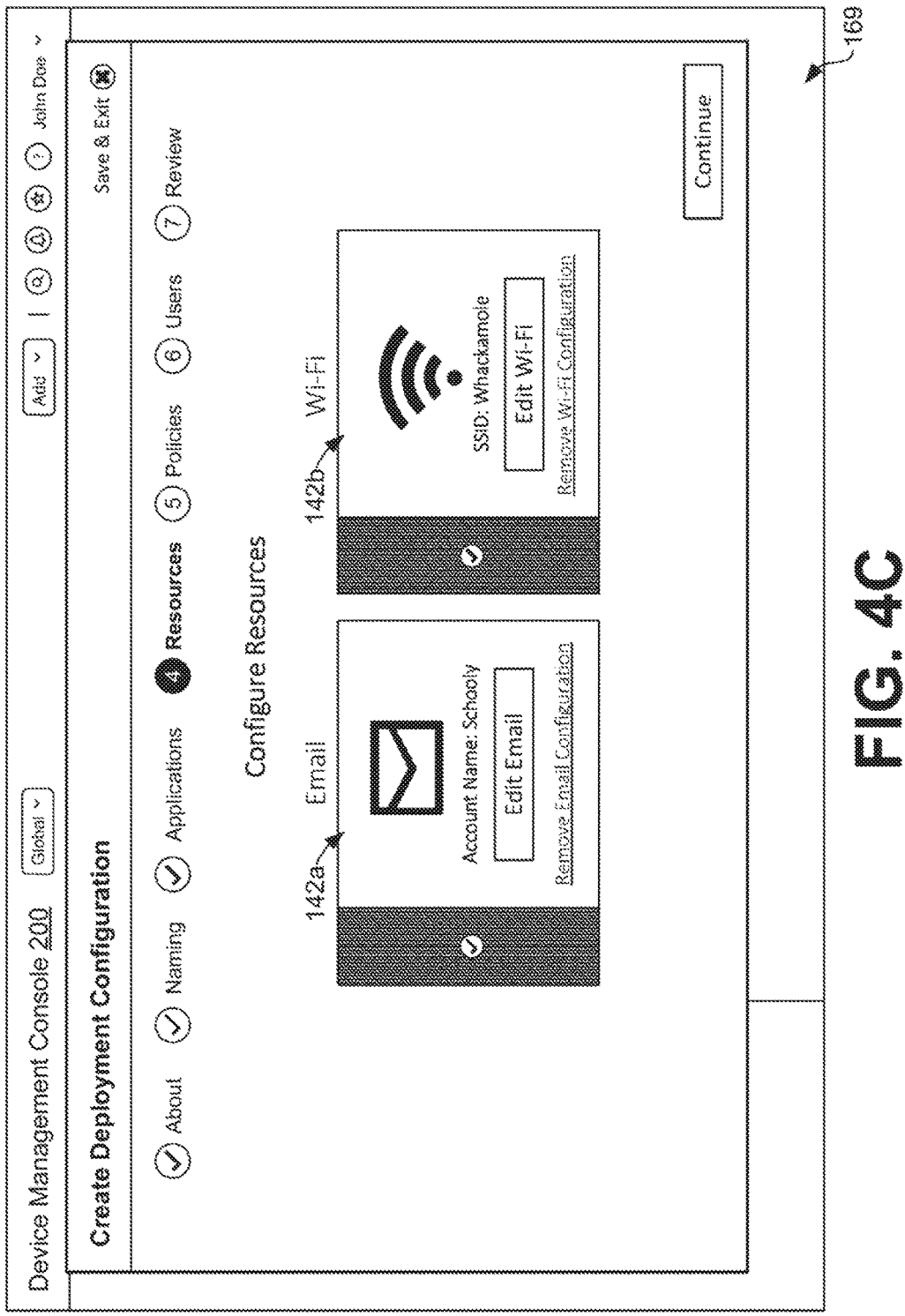

Turning now to FIG. 4C, the ingestion service 118 can present a user interface 169 that facilitate a removal or a further modification of the resources 142 specified by the administrator. As shown in the user interface 169 of FIG. 4C, a first resource 142a has been generated for an email service "Schooly" and a second resource 142b has been generated for a wireless network "Whackamole." When the client device 106 is configured in accordance with the deployment configuration 130, a user of the client device 106 will not have to manually provide information to access his or her email or have to provide authentication information to access the "Whackamole" wireless network.

Figure 5A:
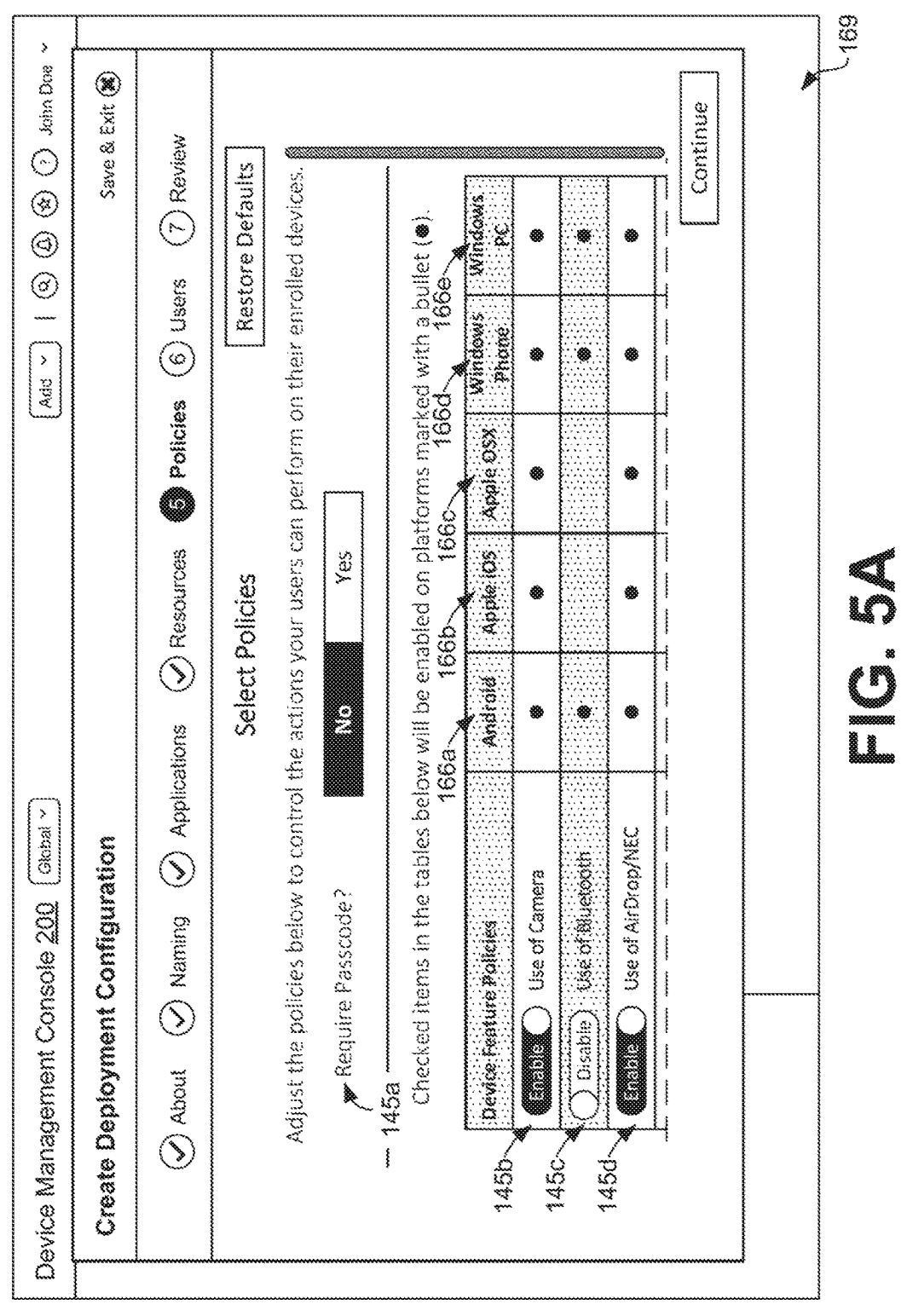

Next, in FIG. 5A, the ingestion service 118 can generate a user interface 169 to collect information pertaining to policies 145a ... 145d to be implemented on the client devices 106. In one example, the agent application 121 can enforce policies 145 specified by the administrator. As different types of operating systems 166a ... 166e have different capabilities, the ingestion process can present information pertaining to each capability, such that the administrator can easily discern which policy 145 to implement on a particular type of client device 106. For instance, a policy 145b can include specifying whether a user of the client device 106 can use the camera. If the policy 145b is enabled by the administrator, the policy 145b will be implemented on each client device 106 having one of the operating systems 166 shown in FIG. 5A. Another policy 145c can include specifying whether a user of the client device 106 can use Bluetooth® functionality. If the policy 145c is enabled by the administrator, the policy 145c will be implemented only on the client device 106 having the Android® or Microsoft Windows® operating systems 166.

Additional types of policies 145a . . . 145f can be specified in the user interface 169 of FIG. 5B. For instance, the administrator can specify whether a client device 106 requires a passcode, a minimum passcode length, an auto locking feature, a maximum number of failed attempts to provide a correct password, a required password complexity, a maximum age of password, or other appropriate policy 145. As can be appreciated, if a selected one of the policies 145 is not implemented on a client device 106, the client device 106 is not in compliance with the management service 115. As a result, the management service 115 can perform one or more suitable remedial actions, such as denying access to enterprise data 136.

Figure 6:
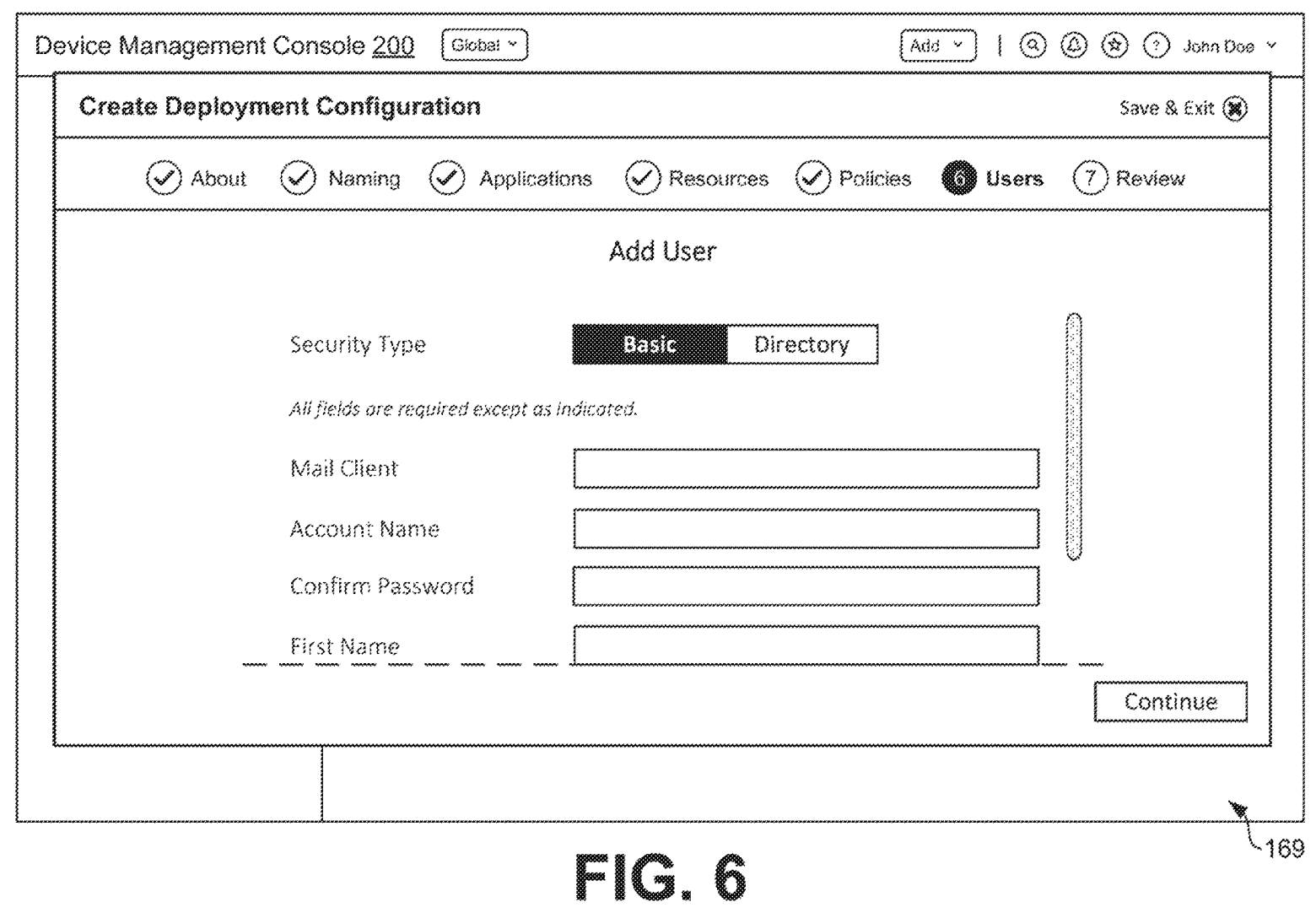

Referring next to FIG. 6, the ingestion service 118 can generate a user interface 169 for collecting information pertaining to users or user groups 148 to be associated with the deployment configuration 130. While the user interface 169 of FIG. 6 can be used to create a new user, other user interfaces 169 can be generated to select existing users to be associated with the deployment configuration 130. Additionally, user interfaces 169 can be generated to create new user groups 148 or select existing user groups 148. If a user or user group 148 is specified, the deployment configuration 130 will be applied to any client devices 106 associated with the user or user group 148.

Figure 7:
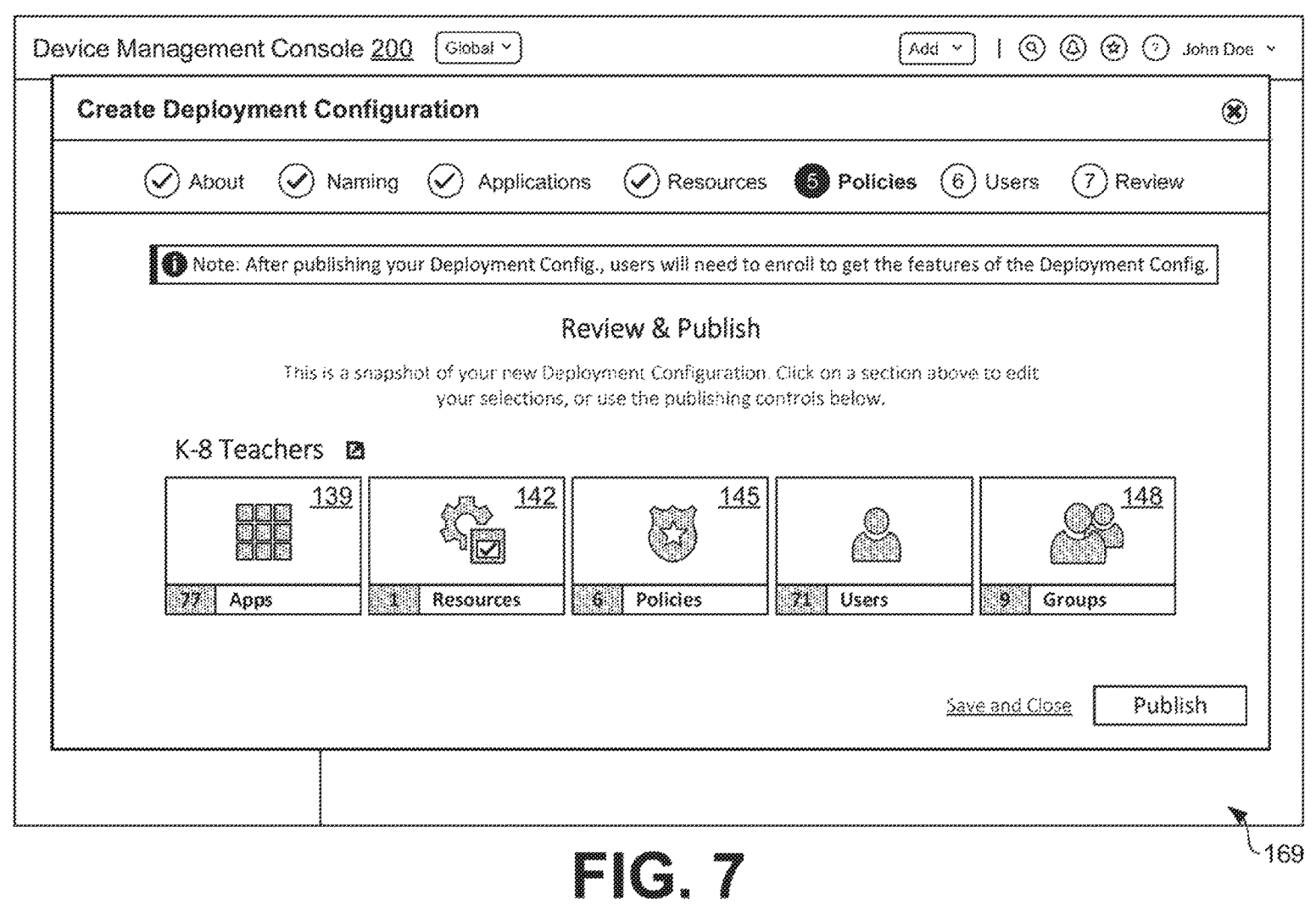

Moving on to FIG. 7, a user interface 169 is shown that provides a review of the information obtained by the ingestion service 118 during the ingestion process. The user interface 169 of FIG. 7 indicates that seventy-seven client applications 139, one resource 142, six policies 145 are to be deployed on client devices 106 associated with the seventy-one users in the nine user groups 148. At this stage of the ingestion process, the administrator can save the deployment configuration 130 generated, or the administrator can choose to publish the deployment configuration 130. Publication can include, for example, the agent application 121 or the management service 115 using the deployment configuration 130 to configure the client devices 106 associated with the seventy-one users or the nine user groups 148 in accordance with the deployment configuration 130.

Figure 8:
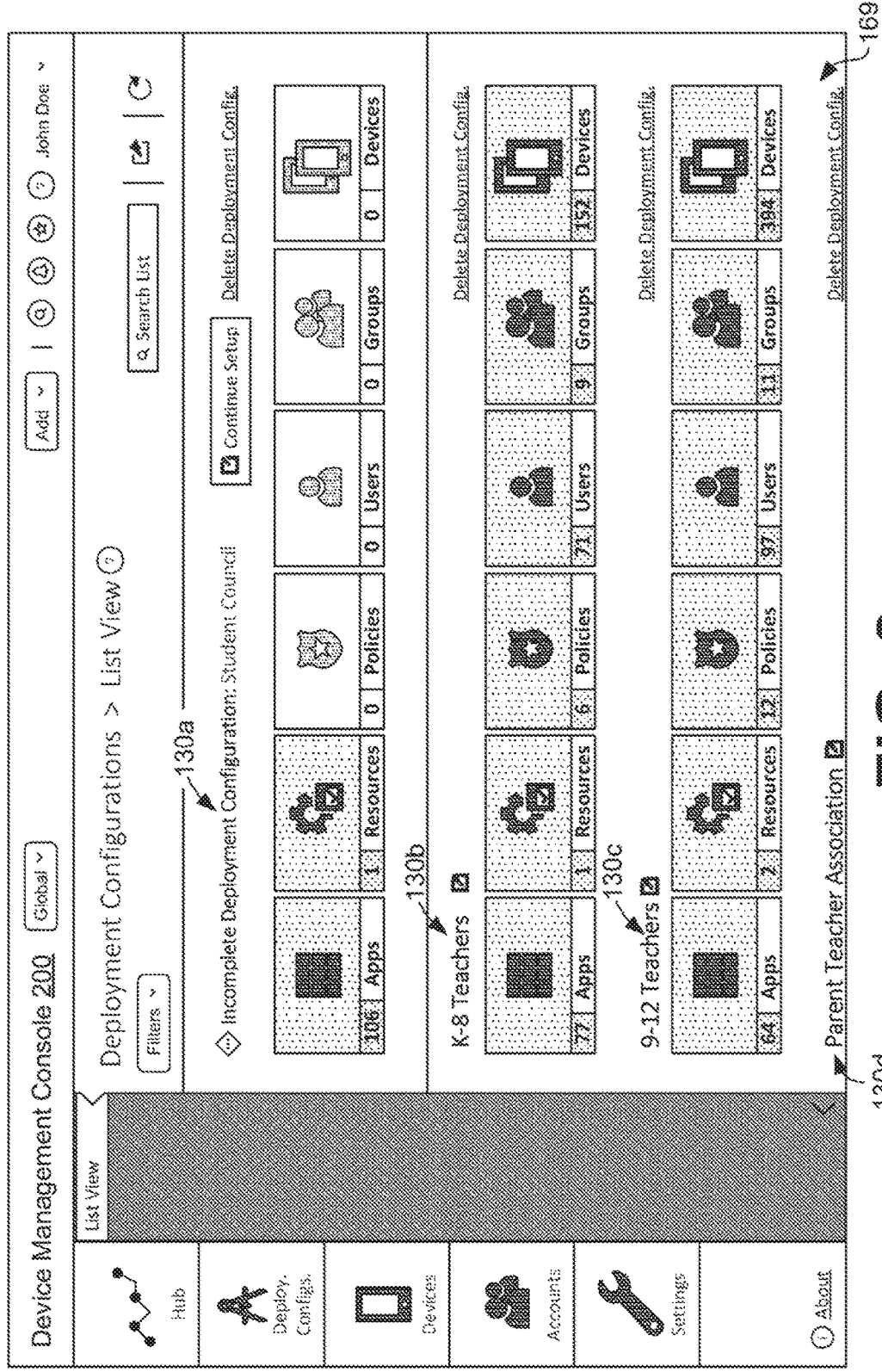

Turning now to FIG. 8, a user interface 169 of the device management console 200 is shown that provides a listing of completed and incomplete deployment configurations 130a . . . 130d. As can be appreciated, the deployment configurations 130 can be further edited and modified by the administrator at an appropriate time.

Figure 9:
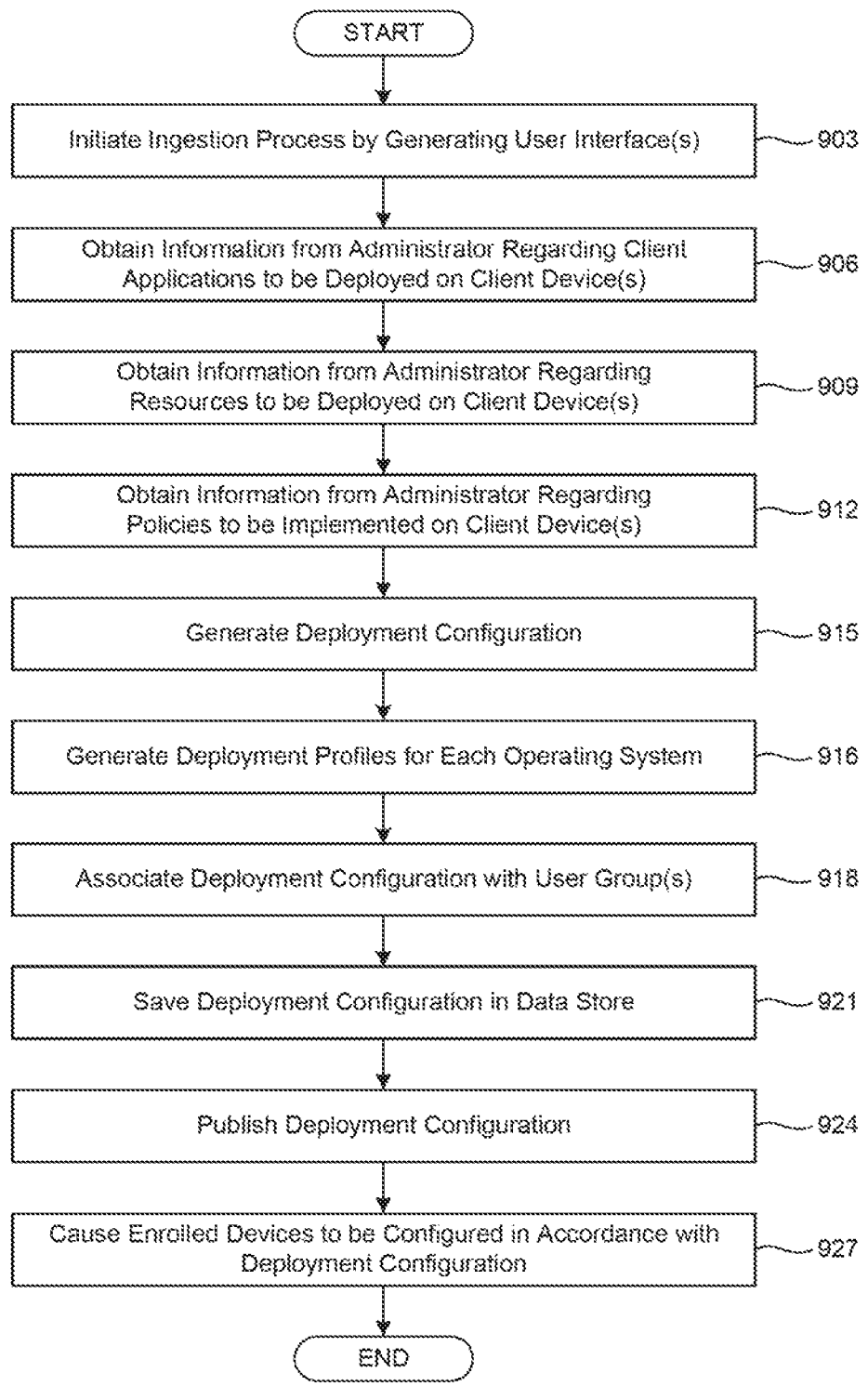
FIG. 9 is a flowchart illustrating functionality implemented by components of the networked environment.

Moving on to FIG. 9, shown is a flowchart that provides one example of the operation of a portion of the computing environment 103. The flowchart of FIG. 9 can be viewed as depicting an example of elements of a method implemented by the management service 115 or the ingestion service 118 executable on the client device 106 according to one or more examples. The separation or segmentation of functionality as discussed herein is presented for illustrative purposes only.

As noted above, configuring devices having one of a multitude of operating systems with varying capabilities and restrictions can be problematic, even to administrators having in-depth knowledge of device configuration. Accordingly, the computing environment 103 can include an ingestion service 118 configured to perform an ingestion process, whereby a series of one or more user interfaces 169 are provided to an administrator. During the ingestion process, information is obtained through the one or more user interfaces 169. Based on the information provided by the administrator during the ingestion process, the computing environment 103 can generate a deployment configuration 130 that is platform independent.

Beginning with step 903, an ingestion process can be initiated by generating one or more user interfaces 169 configured to obtain information from an administrator necessary to configure client devices 106 enrolled with the management service 115. In one example, the ingestion process can be performed by an administrator through a device management console 200 after having provided proper access credentials. The ingestion process, through the one or more user interfaces 169, can collect information pertaining to client applications 139 or resources 142 to be deployed on the client devices 106 enrolled with the management service 115. Additionally, the ingestion process can collect information pertaining to policies 145 to be implemented on the client devices 106 by the agent application 121, the operating system 166, or other suitable software component.

In step 906, the ingestion process, through one or more user interfaces 169, can obtain information pertaining to client applications 139 requiring installation on the client devices 106. For example, an administrator can require an anti-virus application to be installed on each of the client devices 106 enrolled in the management service 115. The ingestion process can perform search queries to identify different versions of a client application 139 available for different types of operating systems 166 or client devices 106, as discussed above with respect to FIGS. 3A-3E. Additionally, as a particular provider of an anti-virus application may not offer a version for each type of operating system 166, the ingestion process can suggest a suitable alternative.

In step 909, the ingestion process can obtain information pertaining to one or more resources 142 to be deployed on the client devices 106 enrolled with the management service 115. In one example, resources 142 can include settings for a wireless network such that the client device 106 can be configured to automatically connect to the wireless network without a user of the client device 106 being required to manually input authentication information, such as a SSID and a password. In another example, resources 142 can include settings for an email service. Using these settings, the agent application 121 can configure the client device 106 to automatically connect to the email without a user of the client device 106 being required to manually input authentication information, such as an email address, password, server, settings, or other technical information.

Next, in step 912, the ingestion process can obtain information pertaining to policies 145 to be implemented on the client devices 106. Policies 145 can include restrictions or controls to be implemented on a client device 106, for example, through the agent application 121. As different types of client devices 106 and operating systems 166 have different capabilities, the ingestion process can present information pertaining to each capability, such that the administrator can easily discern which policy 145 is implement on a particular type of client device 106 or operating system 166, as discussed with respect to FIGS. 5A-5B.

In step 915, a deployment configuration 130 can be generated using the information collected during the ingestion process pertaining to the configuration of the client devices 106. In one example, the deployment configuration 130 can include data stored in a relational database capable of being consulted by the management service 115. In another example, the deployment configuration 130 can include one or more XML documents. The deployment configuration 130 can be generated to be universal across the client devices 106 independent of the different types of operating systems 166. For instance, a single deployment configuration 130 can be generated that is capable of configuring client devices 106 having Microsoft Windows®, Apple iOS®, Android®, Ubuntu® Linux, or other operating system 166 installed thereon.

In step 916, generating a deployment configuration 130 can include, for example, creating one or more deployment profiles for each type or version of operating system 166 or client device 106. In one example, a first deployment profile is created for the Microsoft Windows® mobile operating system 166, a second deployment profile is created with the Microsoft Windows® PC operating system 166, a third deployment profile is created for the Apple iOS® operating system 166, and so forth. The deployment profiles are generated using information provided during the ingestion process for that type or version of operating system 166 of client device 106. When a device is enrolled with the management service 115, a corresponding one of the deployment profiles is consulted and the client device 106 is configured in accordance with the deployment profiles. Similar to the deployment configuration 130, a deployment profile can include an XML file or information stored in a structured relational database, such as an SQL database. In one example, the management service 115, via the agent application 121, can identify a type or version of the operating system 166 and the management service 115 can identify a deployment profile corresponding to the type or version of the operating system 166 and configure the client device 106 in accordance with the deployment profile.

In step 918, the deployment configuration 130 can be associated with a corresponding one of the user groups 148. To this end, only the client devices 106 associated with the user groups 148 will be configured in accordance with the deployment configuration 130. In step 921, the deployment configuration 130 can be saved in the data store 112 for further modification or for consultation by the management service 115 or the agent application 121. In one example, the deployment configuration 130 can be saved in the data store 112 by generating one or more data records describing the deployment configuration 130 and establishing one or more relationships between such data records. For instance, a data record can be generated that represents a deployment configuration 130, a data record can be generated that represents an administrator's specifications for one or more client applications 139a associated with the deployment configuration 130, a data record can be generated that represents an administrator's specifications for one or more resources 142a associated with the deployment configuration 130, a data record can be generated that represents an administrator's specifications for one or more policies associated with the deployment configuration 130, and a data record can be generated that represents one or more client devices 106 that are subject to the deployment configuration 130. Additionally, one or more relationships between such data records can be established by generating indications (within the respective data records or within data records of their own) of the relationships. For example, indications of relationships between a deployment configuration 130 data record and one or more of a client application 139a data record, a resources 142a data record, or a policies 145a data record can be generated, which can cause the management service 115 to associate the respective client applications 139a, resources 142a and policies 145a with the respective deployment configuration 130. Further, for example, an indication of a relationship between a deployment configuration 130 data record and one or more subject client device 106 data records can be generated, which can cause the management service 115 to associate the respective client devices 106 with the deployment configuration 130. By storing the deployment configuration 130 in the data store 112 using such related data records, performance of processing and efficiency of data storage are achieved (e.g., by reducing the amount of data stored in the data store 112).

In step 924, the deployment configuration 130 can be published by the administrator. In one example, upon the administrator requesting the deployment configuration 130 be published, the management service 115 can store the deployment configuration 130 in command queues associated with is one or more client devices 106 that are subject to the deployment configuration 130. Thereafter, upon the agent application 121 checking in with the management service 115, the agent application 121 can access the deployment configuration 130 by downloading it from the respective command queue or from a URL referenced in the command queue. In step 927, publication of the deployment configuration 130 can include, for example, causing the agent application 121 or the management service 115 to configure applicable client devices 106 in accordance with the deployment configuration 130.

Referring next to FIG. 10, shown is a deployment configuration 130 having XML markup. In one example, data records representing one or more of deployment configurations 130, client applications 139a, resources 142a, and policies 145a can include an XML markup that represents the specifications of such data records. In another example, upon a request to publish a deployment configuration 130 to a client device 106, for instance, the management service 115 or agent application 121 can translate data records representing one or more of deployment configurations 130, client applications 139a, resources 142a, and policies 145a into an XML markup. It should be appreciated that other markup languages can be used in place of an XML markup, as may be necessary depending on the particular operating system or client applications 139a of a client device 106. That is, if a client device 106 is not configured to execute or implement XML markup, another markup language can be used to generate a markup that the client device 106 can interpret based on its operating system or client applications 139a. In any case, the management service 115 or agent application 121 can cause the client device 106 to operate in accordance with a deployment configuration 130 by causing the client device 106 to conform its operations to the specifications of an XML markup representing one or more specifications of such deployment configuration 130. In one example, the management service 115 or agent application 121 can instruct an operating system of a client device 106 or client applications 139a executed by the client device 106 to implement the specifications of the XML markup, such as by changing settings or registry values associated with particular functionality of the client device 106 to reflect the specifications of the XML markup.

As shown in FIG. 10, the deployment configuration 130 includes tags specifying configurations for various operating systems 166a and 166b. For one of the operating systems 166, information pertaining to client applications 139a and 139b to be installed can be provided. Additionally, information pertaining to the policies 145*a* . . . 145*d*, such as Bluetooth or camera functionality, can be specified. As the resources 142*a* and 142*b* can include authentication data not reliant on a particular type of operating system 166, the resources 142*a* and 142*b* can be specified independent of information pertaining to the operating systems 166. The resources 142*a* and 142*b* can include, for example, a wireless network configuration, an email service configuration, or other information.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 139, and potentially other applications. Also stored in the memory can be a data store 112 and other data.

A number of software components are stored in the memory and executable by a processor. In this respect, the ten "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 269 generated by the client application 139 or another application can be rendered. In some examples, the user interface 269 can be generated using user interface data provided by the computing environment 103. The client device 106 can also include one or more input/output devices that can include, for example, capacitive touchscreen or other type of touch input device, fingerprint reader, or keyboard.

Although the management service 115, the client application 139, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show as specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execration system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A non-transitory computer-readable medium embodying program instructions executable in at least one computing device that, when executed, cause the at least one computing device to:
   receive information pertaining to a desired configuration provided during an ingestion process where at least one user interface is generated, wherein the information received comprises:
      a selection of a client application and a resource to be installed on a plurality of client devices enrolled with a management service having different operating systems installed thereon; and
      a selection of a policy to implement on the client devices, the policy comprising a restriction on a hardware function or a software function of the client devices, wherein the selection of the policy is made in association with at least one of a plurality of user groups maintained by a management service, and the information further comprises selections of different policies corresponding to different ones of the user groups;
   generate a deployment configuration using the information received during the ingestion process, wherein the deployment configuration is universal across the client devices independent of the different operating systems, the deployment configuration comprising different deployment profiles corresponding to the different operating systems; and
   publish the deployment configuration for at least the at least one of the user groups, wherein a publication of the deployment configuration causes an agent application executable on individual ones of the client devices associated with the at least one of the one user groups to automatically install the client application and the resource on the client devices, and implement the policy on the client devices, the agent application being configured to determine that a respective one of the client devices is associated with conflicting policies existing in the deployment configuration based on the respective one of the client devices being specified in more than one of the user groups, and apply a most restrictive policy of the conflicting policies.

2. The non-transitory computer-readable medium of claim 1, wherein the deployment configuration comprises an extensible markup language (XML) document programmatically generated by the at least one computing device.

3. The non-transitory computer-readable medium of claim 1, wherein the ingestion process comprises:
   identifying a specification of the client application made in the at least one user interface;
   querying a service to identify a plurality of different versions of the client application compatible with each of the different operating systems; and
   adding the different versions of the client application to the different deployment profiles of the deployment configuration.

4. The non-transitory computer-readable medium of claim 1, wherein the ingestion process comprises:
   identifying a specification of the client application made in the at least one user interface;
   querying a service to identify a suggested alternative application identified based at least in part on data associated with the client application in response to the client application not being compatible with one of the different operating systems; and
   adding the suggested alternative application to a particular deployment profile of the deployment configuration, wherein the particular deployment profile corresponds to one of the different operating systems.

5. The non-transitory computer-readable medium of claim 1, wherein the resource comprises authentication credentials for at least one of: a wireless network or an email service.

6. The non-transitory computer-readable medium of claim 1, wherein the resource comprises a wildcard that is replaced on each of the client devices by the agent application that configures the respective one of the client devices in accordance with the deployment configuration, wherein the agent application replaces the wildcard with a user-specific parameter.

7. A system, comprising:
   at least one computing device; and
   program instructions executable in the at least one computing device that, when executed, cause the at least one computing device to:
      receive information pertaining to a desired configuration provided during an ingestion process where at least one user interface is generated, wherein the information received comprises:
         a selection of a client application and a resource to be installed on a plurality of client devices enrolled with a management service having different operating systems installed thereon; and
         a selection of a policy to implement on the client devices, the policy comprising a restriction on a hardware function or a software function of the client devices, wherein the selection of the policy is made in association with a particular one of a plurality of user groups maintained by a management service, and the information further comprises selections of different policies corresponding to different ones of the user groups;
      generate a deployment configuration using the information received during the ingestion process, wherein the deployment configuration is universal across the client devices independent of the different operating systems, the deployment configuration comprising different deployment profiles corresponding to the different operating systems; and
      publish the deployment configuration for at least the particular one of the user groups, wherein a publication of the deployment configuration causes an agent application executable on individual ones of the client devices associated with the particular one of the one user groups to automatically install the client application and the resource on the client devices, and implement the policy on the client devices, the agent application being configured to determine that a respective one of the client devices is associated with conflicting policies existing in the deployment configuration based on the respective one of the client devices being specified in more than one of the user groups, and apply a most restrictive policy of the conflicting policies.

8. The system of claim 7, wherein the deployment configuration comprises an extensible markup language (XML) document programmatically generated by the at least one computing device.

9. The system of claim 7, wherein the ingestion process comprises:
identifying a specification of the client application made in the at least one user interface;
querying a service to identify a plurality of different versions of the client application compatible with each of the different operating systems; and
adding the different versions of the client application to the different deployment profiles of the deployment configuration.

10. The system of claim 7, wherein the ingestion process comprises:
identifying a specification of the client application made in the at least one user interface;
querying a service to identify a suggested alternative application identified based at least in part on data associated with the client application in response to the client application not being compatible with one of the different operating systems; and
adding the suggested alternative application to a particular deployment profile of the deployment configuration, wherein the particular deployment profile corresponds to the one of the different operating systems.

11. The system of claim 7, wherein the resource comprises authentication credentials for at least one of: a wireless network or an email service.

12. The system of claim 7, wherein the resource comprises a wildcard that is replaced on each of the client devices by an agent application that configures a respective one of the client devices in accordance with the deployment configuration, wherein the agent application replaces the wildcard with a user-specific parameter.

13. A computer-implemented method, comprising:
receiving information pertaining to a desired configuration provided during an ingestion process where at least one user interface is generated, wherein the information received comprises:
a selection of a client application and a resource to be installed on a plurality of client devices enrolled with a management service; and
a selection of a policy to implement on the client devices, the policy comprising a restriction on a hardware function or a software function of the client devices, individual ones of the client devices having different operating systems installed thereon;
generating a deployment configuration using the information received during the ingestion process, wherein the deployment configuration is universal across the client devices independent of the different operating systems, the deployment configuration comprising different deployment profiles corresponding to the different operating systems; and
publishing the deployment configuration for at least the particular one of the user groups, wherein a publication of the deployment configuration causes an agent application executable on individual ones of the client devices associated with the particular one of the one user groups to automatically install the client application and the resource on the client devices, and implement the policy on the client devices, the agent application being configured to determine that a respective one of the client devices is associated with conflicting policies existing in the deployment configuration based on the respective one of the client devices being specified in more than one of the user groups, and apply a most restrictive policy of the conflicting policies.

14. The computer-implemented method of claim 13, wherein the ingestion process comprises:
identifying a specification of the client application made in the at least one user interface;
querying a service to identify a plurality of different versions of the client application compatible with each of the different operating systems; and
adding the different versions of the client application to the different deployment profiles of the deployment configuration.

15. The computer-implemented method of claim 13, wherein the ingestion process comprises:
identifying a specification of the client application made in the at least one user interface;
querying a service to identify a suggested alternative application identified based at least in part on data associated with the client application in response to the client application not being compatible with one of the different operating systems; and
adding the suggested alternative application to a particular deployment profile of the deployment configuration, wherein the particular deployment profile corresponds to the one of the different operating systems.

16. The computer-implemented method of claim 13, wherein the resource comprises authentication credentials for at least one of: a wireless network or an email service.

17. The computer-implemented method of claim 13, wherein the resource comprises a wildcard that is replaced on each of the client devices by an agent application that configures a respective one of the client devices in accordance with the deployment configuration, wherein the agent application replaces the wildcard with a user-specific parameter.

* * * * *